United States Patent
Stefik et al.

(10) Patent No.: US 7,031,471 B2
(45) Date of Patent: Apr. 18, 2006

(54) SYSTEM FOR CONTROLLING THE DISTRIBUTION AND USE OF RENDERED DIGITAL WORKS THROUGH WATERMARKING

(75) Inventors: Mark J. Stefik, Portola Valley, CA (US); Glen W. Petrie, Los Gatos, CA (US); Steve A. Okamoto, Torrance, CA (US); Nicholas H. Briggs, Palo Alto, CA (US)

(73) Assignee: ContentGuard Holdings, Inc., Wilmington, DE (US)

( * ) Notice: Subject to any disclaimer, the term of this patent is extended or adjusted under 35 U.S.C. 154(b) by 1044 days.

(21) Appl. No.: 09/778,005

(22) Filed: Feb. 7, 2001

(65) Prior Publication Data

US 2001/0008557 A1 Jul. 19, 2001

Related U.S. Application Data

(62) Division of application No. 08/948,893, filed on Oct. 10, 1997, now Pat. No. 6,233,684.
(60) Provisional application No. 60/039,275, filed on Feb. 28, 1997.

(51) Int. Cl.
*G06K 9/00* (2006.01)

(52) U.S. Cl. ...................................... 380/231; 713/176
(58) Field of Classification Search ................ 380/231; 713/176
See application file for complete search history.

(56) References Cited

U.S. PATENT DOCUMENTS

| 3,263,158 A | 7/1966 | Bargen et al. |
| 3,609,697 A | 9/1971 | Blevins et al. |

(Continued)

FOREIGN PATENT DOCUMENTS

| EP | 0 084 441 | 7/1983 |
| EP | 0 180 460 | 5/1986 |

(Continued)

OTHER PUBLICATIONS

Brassil, Jack T., et al., "*Electronic Marking and Identification Techniques to Discourage Document Copying*", IEEE Journal on Selected Areas in Communications, IEEE Inc. New York, US, vol. 13, No. 8, Oct. 1, 1995 pp. 1495–1503.
European Search Report Dated Aug. 6, 2003.
Clark, P.C. and Hoffman, L.J., "Bits: A Smartcard Protected Operating System," *Communications of the ACM*, Nov. 1994, vol. 37, No. 11, pp. 66–70, and 94.

(Continued)

*Primary Examiner*—Albert Decady
*Assistant Examiner*—Todd Jack
(74) *Attorney, Agent, or Firm*—Marc S. Kaufman; Nixon Peabody, LLP

(57) ABSTRACT

A trusted rendering system for use in a system for controlling the distribution and use of digital works. A trusted rendering system facilitates the protection of rendered digital works which have been rendered on a system which controls the distribution and use of digital works through the use of dynamically generated watermark information that is embedded in the rendered output. The watermark data typically provides information relating to the owner of the digital work, the rights associated with the rendered copy of the digital work and when and where the digital work was rendered. This information will typically aid in deterring or preventing unauthorized copying of the rendered work to be made. The system for controlling distribution and use of digital works provides for attaching persistent usage rights to a digital work. Digital works are transferred between repositories which are used to request and grant access to digital works. Such repositories are also coupled to credit servers which provide for payment of any fees incurred as a result of accessing a digital work.

33 Claims, 13 Drawing Sheets

U.S. PATENT DOCUMENTS

| | | |
|---|---|---|
| 3,790,700 A | 2/1974 | Callais et al. |
| 3,798,605 A | 3/1974 | Feistel |
| 4,159,468 A | 6/1979 | Barnes et al. |
| 4,220,991 A | 9/1980 | Hamano et al. |
| 4,278,837 A | 7/1981 | Best |
| 4,323,921 A | 4/1982 | Guillou |
| 4,442,486 A | 4/1984 | Mayer |
| 4,529,870 A | 7/1985 | Chaum |
| 4,558,176 A | 12/1985 | Arnold et al. |
| 4,593,376 A | 6/1986 | Volk |
| 4,614,861 A | 9/1986 | Pavlov et al. |
| 4,644,493 A | 2/1987 | Chandra et al. |
| 4,658,093 A | 4/1987 | Hellman |
| 4,713,753 A | 12/1987 | Boebert et al. |
| 4,817,140 A | 3/1989 | Chandra et al. |
| 4,827,508 A | 5/1989 | Shear |
| 4,868,376 A | 9/1989 | Lessin et al. |
| 4,891,838 A | 1/1990 | Faber |
| 4,924,378 A | 5/1990 | Hershey et al. |
| 4,932,054 A | 6/1990 | Chou et al. |
| 4,937,863 A | 6/1990 | Robert et al. |
| 4,949,187 A | 8/1990 | Cohen |
| 4,953,209 A | 8/1990 | Ryder, Sr. et al. |
| 4,961,142 A | 10/1990 | Elliott et al. |
| 4,975,647 A | 12/1990 | Downer et al. |
| 4,977,594 A | 12/1990 | Shear |
| 4,999,806 A | 3/1991 | Chernow et al. |
| 5,010,571 A | 4/1991 | Katznelson |
| 5,014,234 A | 5/1991 | Edwards, Jr. |
| 5,023,907 A | 6/1991 | Johnson et al. |
| 5,047,928 A | 9/1991 | Wiedemer |
| 5,050,213 A | 9/1991 | Shear |
| 5,052,040 A | 9/1991 | Preston et al. |
| 5,058,164 A | 10/1991 | Elmer et al. |
| 5,103,476 A | 4/1992 | Waite et al. |
| 5,113,519 A | 5/1992 | Johnson et al. |
| 5,136,643 A | 8/1992 | Fischer |
| 5,138,712 A | 8/1992 | Corbin |
| 5,146,499 A | 9/1992 | Geffrotin |
| 5,148,481 A | 9/1992 | Abraham et al. |
| 5,159,182 A | 10/1992 | Eisele |
| 5,183,404 A | 2/1993 | Aldous et al. |
| 5,191,193 A | 3/1993 | Le Roux |
| 5,204,897 A | 4/1993 | Wyman |
| 5,222,134 A | 6/1993 | Waite et al. |
| 5,235,642 A | 8/1993 | Wobber et al. |
| 5,247,575 A | 9/1993 | Sprague et al. |
| 5,255,106 A | 10/1993 | Castro |
| 5,260,999 A | 11/1993 | Wyman |
| 5,263,157 A | 11/1993 | Janis |
| 5,263,158 A | 11/1993 | Janis |
| 5,276,444 A | 1/1994 | McNair |
| 5,276,735 A | 1/1994 | Boebert et al. |
| 5,291,596 A | 3/1994 | Mita |
| 5,301,231 A | 4/1994 | Abraham et al. |
| 5,311,591 A | 5/1994 | Fischer |
| 5,319,705 A | 6/1994 | Halter et al. |
| 5,337,357 A | 8/1994 | Chou et al. |
| 5,339,091 A | 8/1994 | Yamazaki et al. |
| 5,341,429 A | 8/1994 | Stringer et al. |
| 5,347,579 A | 9/1994 | Blandford |
| 5,381,526 A | 1/1995 | Ellson |
| 5,394,469 A | 2/1995 | Nagel et al. |
| 5,410,598 A | 4/1995 | Shear |
| 5,412,717 A | 5/1995 | Fischer |
| 5,428,606 A | 6/1995 | Moskowitz |
| 5,432,849 A | 7/1995 | Johnson et al. |
| 5,438,508 A | 8/1995 | Wyman |
| 5,444,779 A | 8/1995 | Daniele |
| 5,453,601 A | 9/1995 | Rosen |
| 5,455,953 A | 10/1995 | Russell |
| 5,457,746 A | 10/1995 | Dolphin |
| 5,473,687 A | 12/1995 | Lipscomb et al. |
| 5,473,692 A | 12/1995 | Davis |
| 5,499,298 A | 3/1996 | Narasimhalu et al. |
| 5,502,766 A | 3/1996 | Boebert et al. |
| 5,504,814 A | 4/1996 | Miyahara |
| 5,504,818 A | 4/1996 | Okano |
| 5,504,837 A | 4/1996 | Griffeth et al. |
| 5,509,070 A | 4/1996 | Schull |
| 5,530,235 A | 6/1996 | Stefik et al. |
| 5,530,759 A | 6/1996 | Braudaway et al. |
| 5,532,920 A | 7/1996 | Hartrick et al. |
| 5,534,975 A | 7/1996 | Stefik et al. |
| 5,539,735 A | 7/1996 | Moskowitz |
| 5,563,946 A | 10/1996 | Cooper et al. |
| 5,568,552 A | 10/1996 | Davis |
| 5,621,797 A | 4/1997 | Rosen |
| 5,629,980 A | 5/1997 | Stefik et al. |
| 5,633,932 A | 5/1997 | Davis et al. |
| 5,634,012 A | 5/1997 | Stefik et al. |
| 5,638,443 A | 6/1997 | Stefik et al. |
| 5,649,013 A | 7/1997 | Stuckey et al. |
| 5,655,077 A | 8/1997 | Jones et al. |
| 5,708,717 A | 1/1998 | Alasia |
| 5,734,823 A | 3/1998 | Saigh et al. |
| 5,734,891 A | 3/1998 | Saigh |
| 5,737,413 A | 4/1998 | Akiyama et al. |
| 5,737,416 A | 4/1998 | Cooper et al. |
| 5,745,569 A | 4/1998 | Moskowitz et al. |
| 5,748,783 A | 5/1998 | Rhoads |
| 5,757,907 A | 5/1998 | Cooper et al. |
| 5,761,686 A | 6/1998 | Bloomberg |
| 5,765,152 A | 6/1998 | Erickson |
| 5,768,426 A | 6/1998 | Rhoads |
| 5,825,892 A | 10/1998 | Braudaway et al. |
| 5,892,900 A | 4/1999 | Ginter et al. |
| 5,910,987 A | 6/1999 | Ginter et al. |
| 5,915,019 A | 6/1999 | Ginter et al. |
| 5,917,912 A | 6/1999 | Ginter et al. |
| 5,920,861 A | 7/1999 | Hall et al. |
| 5,940,504 A | 8/1999 | Griswold |
| 5,943,422 A | 8/1999 | Van Wie et al. |
| 5,949,876 A | 9/1999 | Ginter et al. |
| 5,982,891 A | 11/1999 | Ginter et al. |
| 5,999,949 A | 12/1999 | Crandall |
| 6,047,067 A | 4/2000 | Rosen |
| 6,112,181 A | 8/2000 | Shear et al. |
| 6,115,471 A | 9/2000 | Oki et al. |
| 6,138,119 A | 10/2000 | Hall et al. |
| 6,157,721 A | 12/2000 | Shear et al. |
| 6,185,683 B1 | 2/2001 | Ginter et al. |
| 6,233,684 B1 | 5/2001 | Stefik et al. |
| 6,237,786 B1 | 5/2001 | Ginter et al. |
| 6,240,185 B1 | 5/2001 | Van Wie et al. |
| 6,253,193 B1 | 6/2001 | Ginter et al. |
| 6,266,618 B1 | 7/2001 | Ye et al. |
| 6,292,569 B1 | 9/2001 | Shear et al. |
| 6,301,660 B1 | 10/2001 | Benson |
| 6,327,652 B1 | 12/2001 | England et al. |
| 6,330,670 B1 | 12/2001 | England et al. |
| 6,345,256 B1 | 2/2002 | Milsted et al. |
| 6,363,488 B1 | 3/2002 | Ginter et al. |
| 6,389,402 B1 | 5/2002 | Ginter et al. |
| 6,442,285 B1 * | 8/2002 | Rhoads et al. ............... 382/100 |
| 6,522,769 B1 * | 2/2003 | Rhoads et al. ............... 382/100 |
| 6,760,463 B1 * | 7/2004 | Rhoads ....................... 382/100 |

FOREIGN PATENT DOCUMENTS

| | | |
|---|---|---|
| EP | 0 332 707 A1 | 9/1989 |
| EP | 0 332 707 | 9/1989 |

| | | | |
|---|---|---|---|
| EP | 0 567 800 A1 | 11/1993 |
| EP | 0 651 554 | 5/1995 |
| EP | 0 665 486 A2 | 8/1995 |
| EP | 0 668 695 | 8/1995 |
| EP | 0 715 247 A1 | 6/1996 |
| EP | 0 725 376 | 8/1996 |
| GB | 2 136 175 | 9/1984 |
| GB | 2 236 604 | 4/1991 |
| GB | 2 236 604 A | 4/1991 |
| JP | 62-241061 | 10/1987 |
| JP | 64-068835 | 3/1989 |
| JP | 04-369068 | 12/1992 |
| JP | 05-268415 | 10/1993 |
| JP | 06-175794 | 6/1994 |
| JP | 06-215010 | 8/1994 |
| JP | 07-084852 | 3/1995 |
| JP | 07-200317 | 8/1995 |
| JP | 07-244639 | 9/1995 |
| JP | 0 715 241 | 6/1996 |
| WO | WO/92 20022 | 11/1992 |
| WO | WO 92/20022 | 11/1992 |
| WO | WO 93/01550 | 1/1993 |
| WO | WO/93 01550 | 1/1993 |
| WO | WO 94/01821 | 1/1994 |
| WO | WO 96/24092 | 8/1996 |
| WO | WO 96/36163 | 11/1996 |
| WO | WO 97/48203 | 12/1997 |
| WO | WO 98/11690 | 3/1998 |
| WO | WO 98/42098 | 9/1998 |
| WO | WO 99/49615 | 9/1999 |
| WO | WO 01/63528 | 8/2001 |

OTHER PUBLICATIONS

Ross, P.E., "Data guard", *Forbes*, Jun. 6, 1994, pp 101.

Saigh, W.K., "Knowledge is Sacred," *Video Pocket/Page Reader Systems, Ltd.*, 1992.

Kahn, R.E., "Deposit, Registration And Recordation In An Electronic Copyright Management System," *Corporation for National Research Initiatives*, Virginia, Aug. 1992, pp. 1–19.

Hilts, P., Mutter, J., and Taylor, S., "BOOKS While U Wait," *Publishers Weekly*, Jan. 3, 1994, pp. 48–50.

Strattner, A., 'Cash register on a chip may revolutionize software pricing and distrubition; Wave Systems Corp.,' *Computer Shopper.* Copyright, Apr. 1994, vol. 14; No. 4; p. 62; ISSN 0886–0556.

O'Conner, M.A., "New distribution option for electric publishers; iOpener data encryption and metering system for CD–ROM use; Column," *CD–ROM Professional*, Copyright, Mar. 1994, vol. 7; No. 2; p. 134; ISSN: 1049–0833.

Willet, S., "'Metered PCs: Is your system watching you?'; Wave Systems beta tests new technology,' *InfoWorld*, Copyright, May 2, 1994, p. 84.

Linn, R.J., "Copyright and Information Services in the Context of the National Research and Education Network[1]," *IMA Intellectual Property Project Proceedings*, Jan. 1994, vol. 1, Issue 1, pp. 9–20.

Simmel, S.S., and Godard, I., "Metering and Licensing of Resources: Kala's General Purpose Approach," *IMA Intellectual Proeprty Project Proceedings*, Jan. 1994, vol. 1, Issue 1, pp. 81–110.

Kahn, R.E., "Deposit, Registration and Recordation in an Electronic Copyright Mangement System," *IMA Intellectual Property Project Proceedings*, Jan. 1994, vol. 1, Issue 1, pp. 111–120.

Tygar, J.D., and Bennet, Y., "Dyad: A System for Using Physically Secure Coprocessors," *IMA Intellectual Property Project Proceedings*, Jan. 1994, vol. 1, Issue 1, pp. 121–152.

Griswold, G.N., "A Method for Protecting Copyright on Networks," *IMA Intellectual Property Project Proceedings*, Jan. 1994, vol. 1, Issue 1, pp. 169–178.

Nelson, T.H., "A Publishing and Royalty Model for Networked Documents," *IMA Intellectual Property Project Proceedings*, Jan. 1994, vol. 1, Issue 1, pp. 257–259.

European Search Report for Corresponding European Application 95308422.5.

Flasche, U. et al., Decentralized Processing of Documents, *Comput. & Graphics*, vol. 10, No. 2, 1986, pp. 119–131.

Mori, R. et al., Superdistribution: The Concept and the Architecture, *The Ttransactions of the IEICE*, vol. E 73, No. 7, 1990, Tokyo, JP, pp. 1133–1146.

Press Release From Electronic Publishing Resources, Inc. (EPR) entitled "National Semiconductor and EPR Partner for Information Metering/Data Security Cards", dated Mar. 4, 1994.

Weber, R., "Metering Technolgies For Digital Intellectual Property," *A Report to the International Federation of Reproduction Rights Organizations*, Oct. 1994, pp. 1–29.

Weber, R., "Digital Rights Management Technology", Oct. 1995.

Perritt, Jr., H.H., "Permissions Headers and Contract Law," *IMA Intellectual Property Project Proceedings*, Jan. 1994, vol. 1, Issue 1, pp. 27–48.

Upthegrove, L., and Roberts, R., "Intellectual Property Header Descriptors: A Dynamic Approach," *IMA Intellectual Property Project Proceedings*, Jan. 1994, vol. 1, Issue 1, pp. 63–66.

Sirbu, M.A., "Internet Billing Service Design and Prototype Implementation," *IMA Intellectual Property Project Proceedings*, Jan. 1994, vol. 1, Issue 1, pp. 67–80.

"National Semiconductor and EPR Partner for Information Metering/Data Security Cards" Mar. 4, 1994, Press Release from Electronic Publishing Resources, Inc.

Weber, R., "Digital Rights Management Technology" Oct. 1995.

Flasche, U. et al., "Decentralized Processing of Documents", pp. 119–131, 1986, Comput. & Graphics, vol. 10, No. 2.

Mori, R. et al., "Superdistribution: The Concept and the Architecture", pp. 1133–1146, 1990, The Transactions of.

Weber, R., "Metering Technologies for Digital Intellectual Property", pp. 1–29, Oct. 1994, A Report to the International Federation of Reproduction Rights Organizations.

Clark, P.C. et al., "Bits: A Smartcard Protected Operating System", pp. 66–70 and 94, Nov. 1994, Communications of the ACM, vol. 37, No. 11.

Ross, P.E., "Data Guard", pp. 101, Jun. 6, 1994, Forbes.

Saigh, W.K., "Knowledge is Sacred", 1992, Video Pocket/Page Reader Systems, Ltd.

Kahn, R.E., "Deposit, Registration and Recordation in an Electronic Copyright Management System", pp. 1–19, Aug. 1992, Corporation for National Research Initiatives, Virginia.

Hilts, P. et al., "Books While U Wait", pp. 48–50, Jan. 3, 1994, Publishers Weekly.

Strattner, A, "Cash Register on a Chip may Revolutionize Software Pricing and Distribution; Wave Systems Corp.", pp. 62, Apr. 1994, Computer Shopper, vol. 14, No. 4, ISSN 0886–0556.

O'Conner, M., "New Distribution Option for Electronic Publishers; iOpener Data Encryption and Metering System for CD–ROM use; Column", pp. 134, Mar. 1994, CD–ROM Professional, vol. 7, No. 2, ISSN: 1409–0833.

Willett, S., "Metered PCs: Is Your System Watching You? Wave System beta tests new technology", pp. 84, May 2, 1994, InfoWorld.

Linn, R., "Copyright and Information Services in the Context of the National Research and Education Network", pp. 9–20, Jan. 1994, IMA Intellectual Property Project Proceedings, vol. 1, Issue 1.

Perrit, Jr., H., "Permission Headers and Contract Law", pp. 27–48, Jan. 1994, IMA Intellectual Property Project Proceedings, vol. 1, Issue 1.

Upthegrove, L., "Intellectual Property Header Descriptors: A Dynamic Approach", pp. 63–66, Jan. 1994, IMA Intellectual Property Proceedings, vol. 1, Issue 1.

Sirbu, M., "Internet Billing Service Design and prototype Implementation", pp. 67–80, Jan. 1994, IMA Intellectual Property Project Proceedings, vol. 1, Issue 1.

Simmel, S. et al., "Metering and Licensing of Resources: Kala's General Purpose Approach", pp. 81–110, Jan. 1994, IMA Intellectual Property Project Proceedings, vol. 1, Issue 1.

Kahn, R., "Deposit, Registration and Recordation in an Electronic Copyright Management System", pp. 111–120, Jan. 1994, IMA Intellectural Property Project Proceedings, vol. 1, Issue 1.

Tygar, J: et al., "Dyad: A System for Using Physically Secure Coprocessors", pp. 121–152, Jan. 1994, IMA Intellectual Property Project Proceedings, vol. 1, Issue 1.

Griswold, G., "A Method for Protecting Copyright on Networks", pp. 169–178, Jan. 1994, IMA Intellectual Property Project Proceedings, vol. 1, Issue 1.

Nelson, T., "A Publishing and Royalty Model for Networked Documents", pp. 257–259, Jan. 1994, IMA Intellectual Property Project Proceedings, vol. 1, Issue 1.

Robinson, E., "Redefining Mobile Computing", pp. 238–240, 247–248 and 252, Jul. 1993, PC Computing.

Abadi, M. et al., "Authentication and Delegation with Smart–cards", 1990, Research Report DEC Systems Research Center.

Mark Stefik, "Letting Loose the Light: Igniting Commerce in Electronic Publication", pp. 219–253, 1996, Internet Dreams: Archetypes, Myths, and Metaphors, IDSN 0–262–19373–6.

Mark Stefik, "Letting Loose the Light: Igniting Commerce in Electronic Publication", pp. 2–35, Feb. 8, 1995, Internet Dreams: Archetypes, Myths and Metaphors.

* cited by examiner

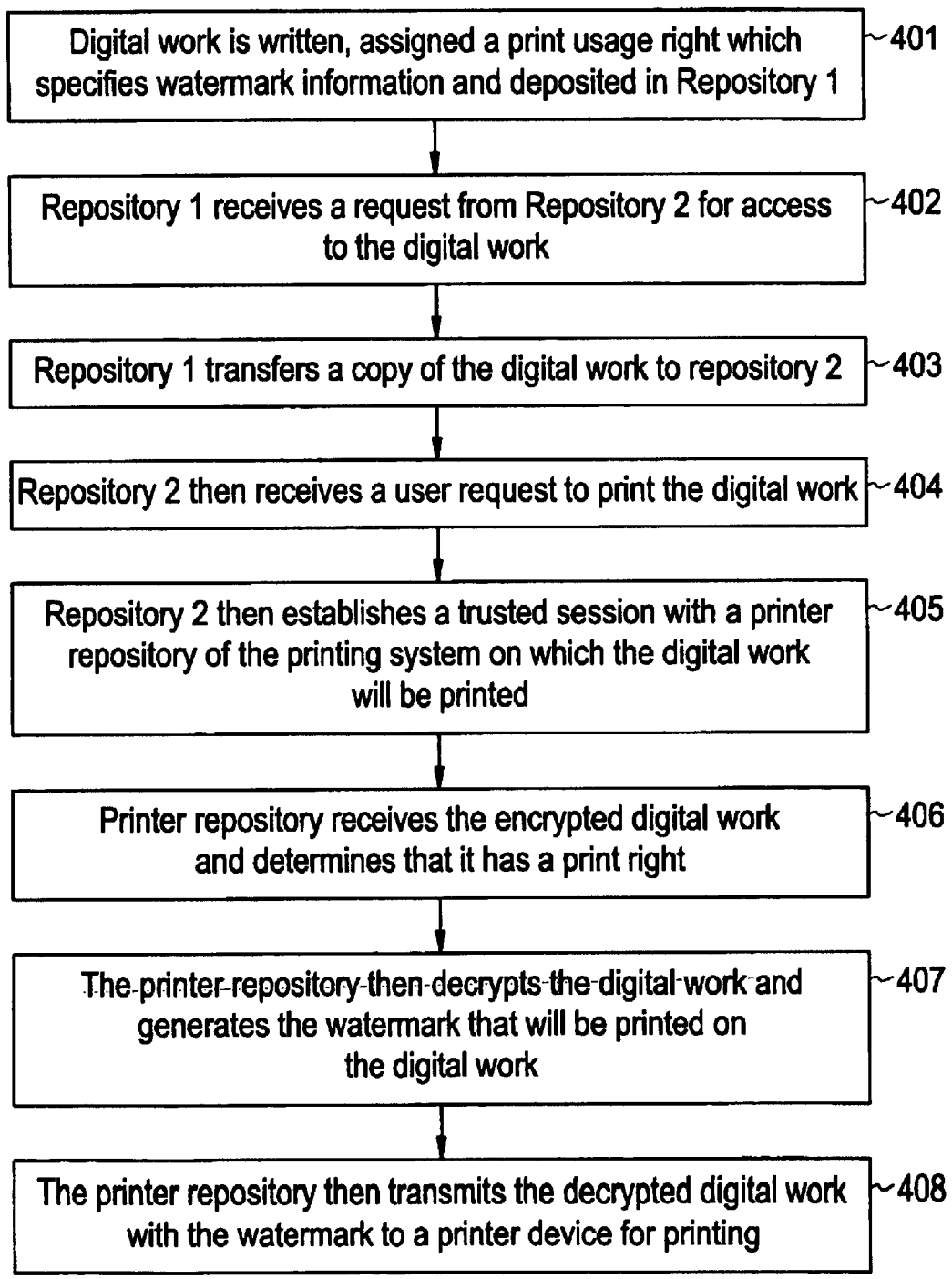

FIG. 5

```
(Work:
  501~(Description: "Title: 'The Moby Dog Story'
                    Copyright 1994 Zeke Jones")
  502~(Work-ID: "Vanity-Press-Registry-lkjdf98734")
  503~(Owner: "Zeke-Jones-ID12345-zxcvoiuyr")

504~(Rights-Group: "Regular"
       (Bundle:
  505 — (Fee: (To:"Account-Jones-Pub24afdoui4398"))
  506 — (Access: (Security-Level: 2)) )
  507~(Copy: (Fee: (Per-Use: 5)))
  508~(Transfer: )
  509~(Delete: )
  510~(Play: )
  511~(Print:            514
                (Fee: (Ticket: "Jones-Prepaid-Print-9085oijgr4"))
                (Printer: "TrustedPrinter--6070-qoeiru45587") )
                (Watermark:                  ⌐513
                    (Watermark-Str: "Title: Moby Dog Copyright 1994    ⎤
                                    by Zeke Jones.
                                    All Rights Reserved.")             ⎬─516
                    (Watermark-Tokens: user-id institution-location
                                    render-name render-location ⎦
                                    render-time) )))

512~(Print:            515
                (Fee: (Per-Use: 10))
                (Printed: "TrustedPrinter--6070-qoeiru45587") ) ))
                (Watermark:                  ⌐513
                    (Watermark-Str: "Title: Moby Dog Copyright 1994    ⎤
                                    by Zeke Jones.
                                    All Rights Reserved.")             ⎬─517
                    (Watermark-Tokens: user-id institution-location
                                    render-name render-location
                                    render-time) )))
```

FIG. 6

```
(Work:
        (Description: "Title: 'The Moby Dog Story'
                Copyright 1994 Zeke Jones")
        (Work-ID: "Vanity-Press-Registry-lkjdf98734")
        (Owner: "Zeke-Jones-ID12345-zxcvoiuyr")

(Rights-Group: "Regular"
        (Bundle:
601~    (Fee: (To:"Account-Jones-Pub24afdoui4398"))
        (Access: (Security-Level: 2))                                   602
        (Copy: (Fee: (Per-Use: 5))                                       )
                (Access: (Destination-Authorization: "Jones-Distributor-9845kjh" )))
        (Transfer: )        (Access: (Destination-Authorization:
                                        "Jones-Distributor-9845kjh" ))))
                                                        (
        (Delete: )                                      603
        (Play: )
        (Print:
                (Fee: (Ticket: "Jones-Prepaid-Print-9085oijgr4"))
                (Printer: "TrustedPrinter--6070-qoeiru45587") )))
                (Watermark:
                        (Watermark-Str: "Title: Moby Dog Copyright 1994
                                        -by-Zeke-Jones.-
604             All Rights Reserved.")
                        (Watermark-Tokens: user-id institution-location
                                        render-name render-location
                                        render-time) )))
```

FIG. 7

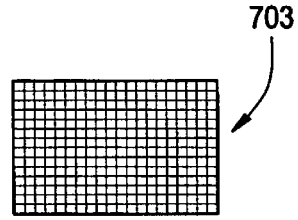

703

Zeke Zack - The Moby Dog Story
Copyright 1994 Zeke Jones. All Rights Reserved

THIS IS A STORY ABOUT A DOG NAMED MOBY. HE WAS A BIG DOG THAT THOUGHT HE WAS A WHALE. THIS IS A STORY ABOUT A DOG NAMED MOBY. HE WAS A BIG DOG THAT THOUGHT HE WAS A WHALE. THIS IS A STORY ABOUT A DOG NAMED MOBY. HE WAS A BIG DOG THAT THOUGHT HE WAS A WHALE. THIS IS A STORY ABOUT A DOG NAMED MOBY. HE WAS A BIG DOG THAT THOUGHT HE WAS A WHALE. THIS IS A STORY ABOUT A DOG NAMED MOBY. HE WAS A BIG DOG THAT THOUGHT HE WAS A WHALE. THIS IS A STORY ABOUT A DOG NAMED MOBY. HE WAS A BIG DOG THAT THOUGHT HE WAS A WHALE. THIS IS A STORY ABOUT A DOG NAMED MOBY. HE WAS A BIG DOG THAT THOUGHT HE WAS A WHALE. THIS IS A STORY ABOUT A DOG NAMED MOBY. HE WAS A BIG DOG THAT THOUGHT HE WAS A WHALE. THIS IS A STORY ABOUT A DOG NAMED MOBY. HE WAS A BIG DOG THAT THOUGHT HE WAS A WHALE. THIS IS A STORY ABOUT A DOG NAMED MOBY. HE WAS A BIG DOG THAT THOUGHT HE WAS A WHALE. THIS IS A STORY ABOUT A DOG NAMED MOBY. HE WAS A BIG DOG THAT THOUGHT HE WAS A WHALE. THIS IS A STORY ABOUT A DOG NAMED MOBY. HE WAS A BIG DOG THAT THOUGHT HE WAS A WHALE. THIS IS A STORY ABOUT A DOG NAMED MOBY. HE WAS A BIG DOG THAT THOUGHT HE WAS A WHALE. THIS IS A STORY ABOUT A DOG NAMED MOBY. HE WAS A BIG DOG THAT THOUGHT HE WAS A WHALE. THIS IS A STORY ABOUT A DOG NAMED MOBY. HE WAS A BIG DOG THAT THOUGHT HE WAS A WHALE. THIS IS A STORY ABOUT A DOG NAMED MOBY. HE WAS A BIG DOG THAT THOUGHT HE WAS A WHALE.

702

901 {
  (Print:
    902~ (Fee: (Per Use: 10))
    903~ (Printed: "TrustedPrinter–6070-qoeiru45587") ) ))
    (Watermark:
              (Watermark-Str: "Title: Moby Dog Copyright 1994
                    by Zeke Jones.
                    All Rights Reserved.")
        904~ (Watermark-Tokens: user-id institution-location
                             render-name render-location
                             render-time) )))

SYSTEM FOR CONTROLLING THE DISTRIBUTION AND USE OF RENDERED DIGITAL WORKS THROUGH WATERMARKING

This application is a Divisional application of Ser. No. 08/948,893, filed Oct. 10, 1997, now U.S. Pat. No. 6,233,684, which claims priority from U.S. Provisional Application Ser. No. 60/039,275 filed Feb. 28, 1997.

FIELD OF THE INVENTION

The present invention relates to the field of distribution and usage rights enforcement for digitally encoded works, and in particular to identification of non-authorized copies of digitally encoded works that have been rendered.

BACKGROUND OF THE INVENTION

Pending U.S. patent application Ser. No. 08/344,042 filed Nov. 29, 1996, incorporated herein by reference, describes a system which provides for the secure and accounted for distribution of digitally encoded works (hereinafter digital works). However, once a digital work leaves the digital domain, e.g. it is printed out, played or otherwise rendered, it is not longer secure and can be subjected to unauthorized copying. This is a problem for all rendered digital works.

Two known techniques for protecting digital works by imparting information onto the digital document are "watermarking" and "fingerprinting". The term watermark historically refers to a translucent design impressed on paper during manufacture which is visible when the paper is held to the light. Because watermarks are impressed using combinations of water, heat, and pressure, they are not easy to add or alter outside of the paper factory. Watermarks are used in making letterheads and are intended to indicate source and that a document is authentic and original and not a reproduction.

One technique for creating such a watermark when a digital work is printed is described in U.S. Pat. No. 5,530,759 entitled "Color Correct Digital Watermarking of Images" issued Jun. 25, 1996. In this approach the watermark image is combined with the digital image to created the watermarked image. The watermark image acts as a template to change the chromacity of corresponding pixels in the digital image thus creating the watermark. In any event, these notices server as social reminders to people to not make photocopies.

The term watermark is now used to cover a wide range of technologies for marking rendered works, including text, digital pictures, and digital audio with information that identifies the work or the publisher. Some watermarks are noticeable to people and some are hidden. In some kinds of watermarks, the embedded information is human readable, but in other kinds the information can only be read by computers.

The term fingerprint is sometimes used in contrast with watermarks to refer to marks that carry information about the end user or rendering event rather than the document or publisher. These marks are called "fingerprints" because they can be used to trace the source of a copy back to a person or computer that rendered the original.

The same technologies and kinds of marks can be used to carry both watermark and fingerprint information. In practice, it is not only possible but often desirable and convenient to combine both kinds of information—for watermarks and fingerprints—in a single mark.

With respect to paper based documents, the simplest approach to providing a mark is a graphical symbol or printed notice that appears on each page. This is analogous to a copyright notice. Such notices can be provided by the publisher in the document source or added later by a printer. These notices serve as social reminders to people to not make photocopies.

Other approaches hide information in the grey codes (or intensity) on a page. Although in principle such approaches can embed data in greycode fonts, their main application so far has been for embedding data in photographs. One set of approaches is described by Cox et al. in a publication entitled "Secure spread spectrum watermarking for Multimedia", NEC Research Institute Technical Report 95-10, NEC Research Institute, Princeton, N.J. 08540. To decode data encoded in the approached described by Cox et al. requires comparing the encoded picture with the original to find the differences. The advantage of these approaches is that they can embed the data in such a way that it is very difficult to remove, not only by mechanical means but also by computational means.

As described above, watermarks need not be perceptible to the viewer. For example, one technique is to embed data in the white space of a document. An example of this kind of approach was described by Brassil, et al. In a publication entitled "Electronic marking and identification techniques to discourage document copying", IEEE Journal on Selected Areas in Communications, Vol. 13, No. 8 pages 1495–1504, October 1995. The idea is to slightly vary the spacing of letters and lines in a digital work. The advantages of this approach are that it is not visible and is hard to remove. The disadvantage is that it has a very limited capacity for carrying data—only a few bytes per page.

Another watermarking scheme for use in digital works representing images is available from the Digimarc Corporation. The Digimarc watermark is invisible and is used to convey ownership information relating to the image. From the Digimarc World Web Page describing their technology (URL http://www.digimarc.com/wt_page.html): "A Digimarc watermark imitates naturally occurring image variations and is placed throughout the image such that it cannot be perceived. To further hide the watermark, the Digimarc watermarking process is perceptually adaptive—meaning it automatically varies the intensity of the watermark in order to remain invisible in both flat and detailed areas of an image." Reading of the Digimarc watermark is through a Digimarc reader which can extract the watermark from the image.

Other prior art relating to embedding data in a print medium includes Daniele, U.S. Pat. No. 5,444,779, on "Electronic Copyright Royalty Accounting System for Using Glyphs", which discloses a system for utilizing a printable, yet unobtrusive glyph or similar two-dimensionally encoded mark to identify copyrighted documents. Upon attempting to reproduce such a document, a glyph is detected, decoded and used to accurately collect and/or record a copyright royalty for the reproduction of the document or to prevent such reproduction. Furthermore, the glyph may also include additional information so as to enable an electronic copyright royalty accounting system, capable of interpreting the encoded information to track and/or account for copyright royalties which accrue during reproduction of all or portions of the original document.

SUMMARY OF THE INVENTION

A trusted rendering system for use in a system for controlling the distribution and use of digital works is disclosed. The currently preferred embodiment of the present invention is implemented as a trusted printer. However, the description thereof applies to any rendering device. A trusted printer facilitates the protection of printed documents which have been printed from a system which controls the distribution and use of digital works. The system for controlling distribution and use of digital works provides for attaching persistent usage rights to a digital work. Digital works are transferred in encrypted form between repositories. The repositories are used to request and grant access to digital works. Such repositories are also coupled to credit servers which provide for payment of any fees incurred as a result of accessing a digital work.

The present invention extends the existing capabilities of the system for controlling distribution and use of digital works to provide a measure of protection when a document is printed. The present invention adds to the system the ability to include watermark information to a document when it is rendered (i.e. a Print right associated with the document is exercised). In the currently preferred embodiment of a trusted printer, the watermark is visible. However, other "invisible" watermarking technologies may also be used. The watermark data typically provides information relating to the owner of a document, the rights associated with that copy of the document and information relating to the rendering event (e.g. when and where the document was printed). This information will typically aid in deterring or preventing unauthorized copying of the rendered work. It is worth noting that the present invention further provides for multiple types of watermarks to be provided on the same digital work.

Specification of the watermark information is preferably added to a document at the time of assigning render or play rights to the digital work. With respect to printed digital works, at the time of page layout special watermark characters are positioned on the document. When the document is printed, a dynamically generated watermark font is created which contains the watermark information specified in the print right. The font of the watermark characters are changed to the dynamically generated watermark font. The dynamically generated watermark font is created using an embedded data technology such as the glyph technology developed by the Xerox Corporation and described in U.S. Pat. No. 5,486,686 entitled "Hardcopy Lossless Data Storage and Communications For Electronic Document Processing Systems", which is assigned to the same assignee as the present application.

BRIEF DESCRIPTION OF THE DRAWINGS

FIG. 4 is a flowchart of the basic steps for digital work creation for printing on a trusted printer as may be performed in the currently preferred embodiment of the present invention.

FIG. 5 is an illustration of a usage rights specification for a digital work that may be printed on a user's trusted printer in the currently preferred embodiment of the present invention.

FIG. 6 is an illustration of a usage rights specification for a digital work that may only be printed on a shared trusted printer residing on a network in the currently preferred embodiment of the present invention.

FIG. 7 is an illustration of a printed page having a glyph encoded watermark.

DETAILED DESCRIPTION OF THE INVENTION

Figure 1:
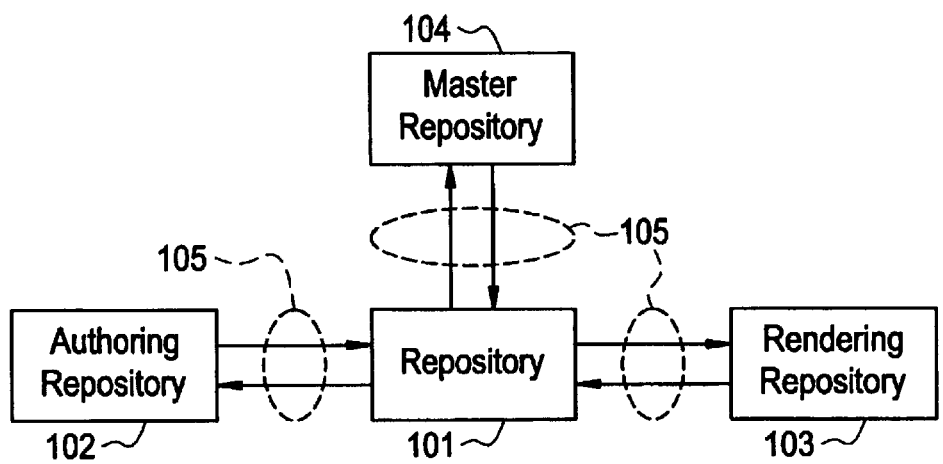
FIG. 1 is a block diagram illustrating the basic interaction between repository types in a system for controlling the distribution and use of digital works in the currently preferred embodiment of the present invention.

A trusted rendering device for minimizing the risk of unauthorized copying of rendered digital works is described. The risk of unauthorized copying of digital documents comes from three main sources: interception of digital copies when they are transmitted (e.g., by wiretapping or packet snooping); unauthorized use and rendering of digital copies remotely stored, and unauthorized copying of a rendered digital work. The design of trusted rendering devices described herein addresses all three risks.

Trusted rendering combines four elements: a usage rights language, encrypted on-line distribution, automatic billing for copies, and digital watermarks for marking copies that are rendered.

Usage Rights language. Content providers indicate the terms, conditions, and fees for printing documents in a machine-readable property rights language.

Encrypted Distribution. Digital works are distributed from trusted systems to trusted rendering devices via computer networks. To reduce the risk of unauthorized interception of a digital work during transmission, it is encrypted. Communication with the rendering system is by way of a challenge-response protocol that verifies the authorization and security of the rendering device.

Automatic Billing. To ensure a reliable income stream to content providers, billing of royalties is on-line and automatic.

Watermarks. Finally, to reduce the risk of copying of rendered works, the rendered work is watermarked to record data about the digital work and the rendering event. Furthermore, watermarks are designed to make copies distinguishable from originals. As will be described below, watermark information is specified within a rendering or play right in the usage rights language.

The currently preferred embodiment of the present invention is implemented as a trusted printer. The foregoing description will be directed primarily to printers, but the concepts and techniques described therein apply equally to other types of rendering systems such as audio players, video players, displays or multi-media players.

Overview of a System for Controlling the Distribution and Use of Digital Works.

The currently preferred embodiment of the present invention operates in a system for controlling the distribution and use of digital works is as described in co-pending U.S. patent application Ser. No. 08/344,042, entitled "System for Controlling the Distribution and Use of Digital Works" and which is herein incorporated by reference. A digital work is any written, audio, graphical or video based work including computer programs that have been translated to or created in a digital form, and which can be recreated using suitable rendering means such as software programs. The system allows the owner of a digital work to attach usage rights to the work. The usage rights for the work define how it may be used and distributed. Digital works and their usage rights are stored in a secure repository. Digital works may only be accessed by other secure repositories. A repository is deemed secure if it possesses a valid identification (digital) certificate issued by a Master repository.

The usage rights language for controlling a digital work is defined by a flexible and extensible usage rights grammar. The usage rights language of the currently preferred embodiment is provided in Appendix A. Conceptually, a right in the usage rights grammar is a label attached to a predetermined behavior and defines conditions to exercising the right. For example, a COPY right denotes that a copy of the digital work may be made. A condition to exercising the right is the requester must pass certain security criteria. Conditions may also be attached to limit the right itself. For example, a LOAN right may be defined so as to limit the duration of which a work may be LOANed. Conditions may also include requirements that fees be paid.

A repository is comprised of a storage means for storing a digital work and its attached usage rights, an external interface for receiving and transmitting data, a processor and a clock. A repository generally has two primary operating modes, a server mode and a requester mode. When operating in a server mode, the repository is responding to requests to access digital works. When operating in requester mode, the repository is requesting access to a digital work.

Generally, a repository will process each request to access a digital work by examining the work's usage rights. For example, in a request to make a copy of a digital work, the digital work is examined to see if such "copying" rights have been granted, then conditions to exercise the right are checked (e.g. a right to make 2 copies). If conditions associated with the right are satisfied, the copy can be made. Before transporting the digital work, any specified changes to the set of usage rights in the copy are attached to the copy of the digital work.

Repositories communicate utilizing a set of repository transactions. The repository transactions embody a set of protocols for establishing secure session connections between repositories, and for processing access requests to the digital works. Note that digital works and various communications are encrypted whenever they are transferred between repositories.

Digital works are rendered on rendering systems. A rendering systems is comprised of at least a rendering repository and a rendering device (e.g. a printer, display or audio system). Rendering systems are internally secure. Access to digital works not contained within the rendering repository is accomplished via repository transactions with an external repository containing the desired digital work. As will be described in greater detail below, the currently preferred embodiment of the present invention is implemented as a rendering system for printing digital works.

FIG. 1 illustrates the basic interactions between repository types in the present invention. As will become apparent from FIG. 1, the various repository types will serve different functions. It is fundamental that repositories will share a core set of functionality which will enable secure and trusted communications. Referring to FIG. 1, a repository 101 represents the general instance of a repository. The repository 101 has two modes of operations; a server mode and a requester mode. When in the server mode, the repository will be receiving and processing access requests to digital works. When in the requester mode, the repository will be initiating requests to access digital works. Repository 101 may communicate with a plurality of other repositories, namely authorization repository 102, rendering repository 103 and master repository 104. Communication between repositories occurs utilizing a repository transaction protocol 105.

Communication with an authorization repository 102 may occur when a digital work being accessed has a condition requiring an authorization. Conceptually, an authorization is a digital certificate such that possession of the certificate is required to gain access to the digital work. An authorization is itself a digital work that can be moved between repositories and subjected to fees and usage rights conditions. An authorization may be required by both repositories involved in an access to a digital work.

Communication with a rendering repository 103 occurs in connection with the rendering of a digital work. As will be described in greater detail below, a rendering repository is coupled with a rendering device (e.g. a printer device) to comprise a rendering system.

Communication with a master repository 105 occurs in connection with obtaining an identification certificate. Identification certificates are the means by which a repository is identified as "trustworthy". The use of identification certificates is described below with respect to the registration transaction.

Figure 2:
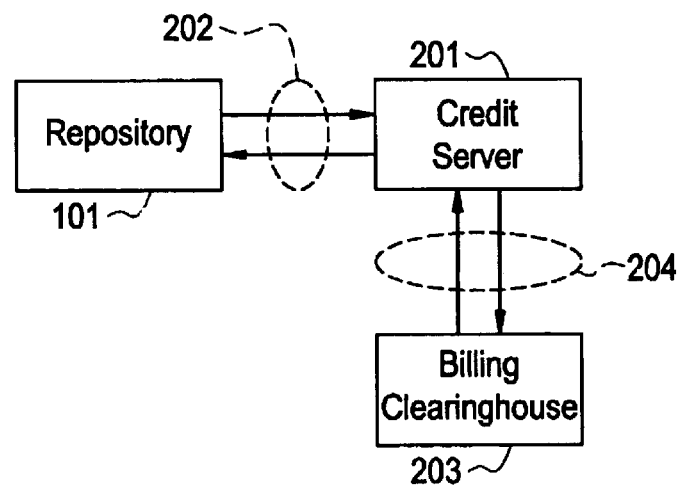
FIG. 2 is an illustration of a repository coupled to a credit server for reporting usage fees as may be used in a system for controlling the distribution and use of digital works in the currently preferred embodiment of the present invention.

FIG. 2 illustrates the repository 101 coupled to a credit server 201. The credit server 201 is a device which accumulates billing information for the repository 101. The credit server 201 communicates with repository 101 via billing transaction 202 to record billing transactions. Billing transactions are reported to a billing clearinghouse 203 by the credit server 301 on a periodic basis. The credit server 201 communicates to the billing clearinghouse 203 via clearinghouse transaction 204. The clearinghouse transactions 204 enable a secure and encrypted transmission of information to the billing clearinghouse 203.

Rendering Systems

A rendering system is generally defined as a system comprising a repository and a rendering device which can render a digital work into its desired form. Examples of a rendering system may be a computer system, a digital audio system, or a printer. In the currently preferred embodiment, the rendering system is a printer. In any event, a rendering system has the security features of a repository. The coupling of a rendering repository with the rendering device may occur in a manner suitable for the type of rendering device.

Figure 3A:
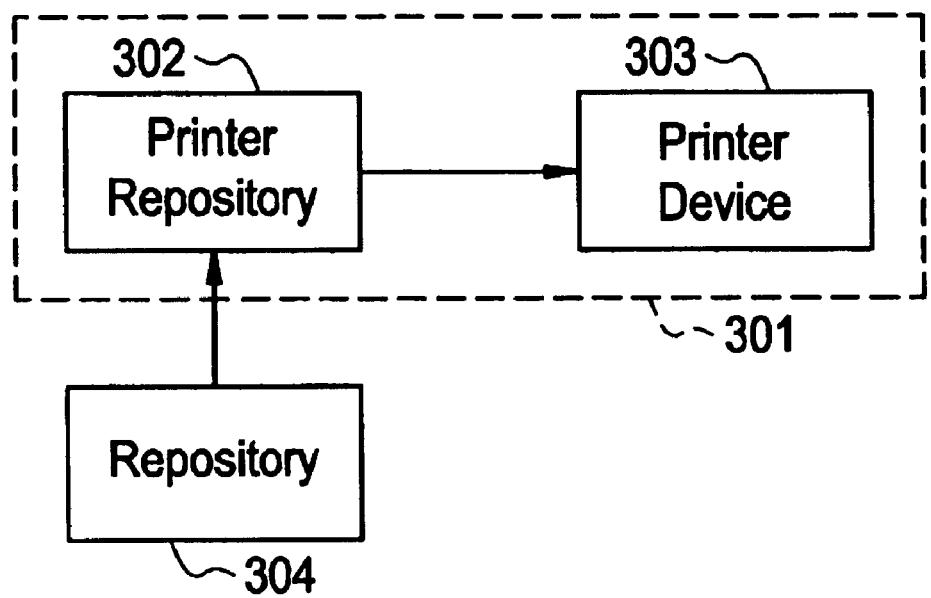
FIG. 3a is an illustration of a printer as a rendering system as may be utilized in a system for controlling the distribution and use of digital works in the currently preferred embodiment of the present invention.

FIG. 3a illustrates a printer as an example of a rendering system. Referring to FIG. 3a, a printer system 301 has contained therein a printer repository 302 and a print device 303. It should be noted that the dashed line defining printer system 301 defines a secure system boundary. Communications within the boundary is assumed to be secure and in the clear (i.e. not encrypted). Depending on the security level, the boundary also represents a barrier intended to provide physical integrity. The printer repository 302 is an instantiation of the rendering repository 105 of FIG. 1. The printer repository 302 will in some instances contain an ephemeral copy of a digital work which remains until it is printed out by the print engine 303. In other instances, the printer repository 302 may contain digital works such as fonts, which will remain and be billed based on use. This design assures that all communication lines between printers and printing devices are encrypted, unless they are within a physically secure boundary. This design feature eliminates a potential "fault" point through which the digital work could be improperly obtained. The printer device 303 represents the printer components used to create the printed output.

Also illustrated in FIG. 3a is the repository 304. The repository 304 is coupled to a printer repository 302. The repository 304 represents an external repository which contains digital works.

Figure 3B:
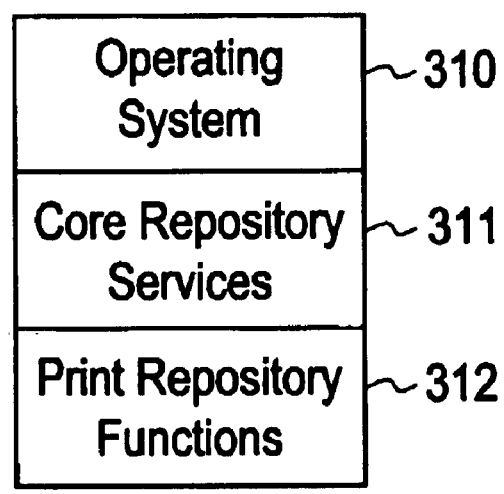
FIG. 3b is a block diagram illustrating the functional elements of a trusted printer repository in the currently preferred embodiment of the present invention.

FIG. 3b is a block diagram illustrating the functional elements of a trusted printer repository. Note that these functional elements also would be present in any rendering repository. Referring to FIG. 3b, the functional embodiment is comprised of an operating system 310, core repository services 311, and print repository functions 312. The operating system 310 is specific to the repository and would typically depend on the type of processor being used to implement the repository. The operating system 1301 would also provide the basic services for controlling and interfacing between the basic components of the repository.

The core repository services 311 comprise a set of functions required by each and every repository. For a trusted printer repository the core repository services will include engaging in a challenge response protocol to receive digital works and decryption of received digital data.

The print repository functions 312 comprise functionality for rendering a work for printing as well as gathering data for and creating a digital watermark. The functionality unique to a print repository will become apparent in the description below (particularly with respect to the flowchart of FIG. 11).

Basic Steps for Digital Work Creation for Printing on a Trusted Printer

FIG. 4 is a flowchart illustrating the basic steps for creating a digital work that may be printed on a trusted printer so that the resulting printed document is also secure. Note that a number of well known implementation steps, e.g. encryption of digital works, have been omitted in order to not detract from the basic steps. First, a digital work is written, assigned usage rights including a print right which specifies watermark information and is deposited in repository 1, step 401. As will be described in more detail below, the assignment of usage rights is accomplished through the use of a rights editor. Deposit of the digital work into repository 1 is an indication that it is being placed into a controlled system. Next, repository 1 receives a request from repository 2 for access to the digital work, step 402 and repository 1 transfers a copy of the digital work to repository 2, step 403. For the sake of this example, it is assumed that a "trusted" session between repository 1 and repository 2 has been established. The challenge response protocol used in this interaction is described in co-pending application Ser. No. 08/344,042 and thus no further discussion on the challenge response protocol is deemed necessary.

Repository 2 then receives a user request to print the digital work, step 404. Repository 2 then establishes a trusted session with a printer repository of the printing system on which the digital work will be printed, step 405. The printer repository receives the encrypted digital work and determines if it has a print right, step 406. If the digital work has the print right, the printer repository decrypts the digital work and generates the watermark that will be printed on the digital work, step 407. The printer repository then transmits the decrypted digital work with the watermark to a printer device for printing, step 408. For example, the decrypted digital work may be a Postscript™ file of the digital work.

Controlling Printing with the Usage Rights Grammar

A key concept in governing sale, distribution, and use of digital works is that publishers can assign "rights" to works that specify the terms and conditions of use. These rights are expressed in a rights language as described in co-pending application Ser. No. 08/344,042. The currently preferred grammar is provided herein in Appendix A. It is advantageous to specify watermark information within a rendering or play right within the grammar for a number of reasons. First, specification in this manner is technology independent. So different watermarking technologies may be used or changed without altering the document. Second, multiple watermarking technologies may be applied to the same digital work, e.g. a visible watermarking technology and an invisible watermarking technology. So if the visible watermark is removed, the invisible one may remain. Third, the watermark information to be placed on the digital work can be associated with the rendering event, rather than the distribution event. Fourth, the watermark information can be extended to include the entire distribution chain of the digital work. Fifth, security and watermarking capabilities of a rendering system may be specified as a condition rendering. This will further insure the trusted rendering of the digital work.

As a result of these advantages, this type of specifying watermark information fully supports the Superdistribution of digital works. Superdistribution is distribution concept where every possessor of a digital work may also be a distributor of the digital work, and wherein every subsequent distribution is accounted for.

When a publisher assigns rights to a digital work, the usage rights enables them to distinguish between viewing (or playing) rights and print rights. Play rights are used to make ephemeral, temporary copies of a work such as an image of text on a display or the sound of music from a loudspeaker. Print rights are used to make durable copies, such as pages from a laser printer or audio recordings on a magnetic media.

Example—Trusted Printing from a Personal Computer

FIG. 5 is an example of the usage rights for a digital work which enables trusted printing from a personal computer. Referring to FIG. 5, various tags are used in for the digital work. The tags "Description" 501, "Work-ID" 502 and "Owner" 503 provide identification information for the digital work.

Usage rights are specified individually and as part of a group of rights. The Rights-Group 504 has been given a name of "Regular". The bundle label provides for a fee payee designation 505 and a minimum security level 506 that are applied to all rights in the group. The fee payee designation 505 is used to indicate who will get paid upon the invocation of a right. The minimum security level 506 is used to indicate a minimum security level for a repository that wishes to access the associated digital work.

The rights in the group are then specified individually. The usage rights specify no fee for transferring 508, deleting 509 or playing 510, but does have a five dollar fee for making a digital copy 507. It also has two Print rights 511 and 512, both requiring a trusted printer (specified by 513). The first Print right 511 can be exercised if the user has a particular prepaid ticket (specified by 514). The second print right has a flat fee of ten dollars (specified by 515). The example assumes that the digital work can be transmitted to a user's computer by exercising the Copy right, and that the user can play or print the work at his or her convenience using the Play and Print rights. Fees are logged from the user's workstation whenever a right is exercised.

Also illustrated in FIG. 5 are watermark specifications 516 and 517. The particular detail for the watermark specifications 516 and 517 is provided below with reference to FIG. 9.

Example—Trusted Printing to an Internet Printer

FIG. 6 illustrates a different set of rights for the same digital book. In this version, the publisher does not want digital delivery to be made to a consumer workstation. A practical consideration supporting this choice may be that the publisher wants to minimize the risk of unauthorized digital copying and requires a higher level of security than is provided by trusted systems on available workstations. Instead, the publisher wants the book to be sent directly from an on-line bookstore to a trusted printer. Printing must be prepaid via digital tickets (see fee specification 601). To enable digital distribution to authorized distributors but not directly to consumers, the publisher requires that both parties in a Copy and Transfer right to have an authorizing digital license (see certificate specifications 602 and 603). Lacking such a license, a consumer can not access the work at a workstation. Instead, he or she must print the work.

Also illustrated in FIG. 6 is the watermark specifications 604. The watermark specification 604 is described in greater detail below with respect to FIG. 9.

Watermarks and Fingerprints

Three main requirements for watermarks on trusted printers have been identified:

Social Reminder. This requirement is for a visible printed indication about whether photocopying is permitted. This could be a printed statement on the document or an established icon or symbol within a corporation indicating a security level for the document.

Auditing. This requirement is for a way to record information on the document about the printing event, such as who owns the print rights, whether photocopying is permitted, and what person or printer printed the document and when the document was printed.

Copy Detection. This requirement is a way for differentiating between printed originals and photocopies. In general, this requirement involves using some print patterns on the page which tend to be distorted by photocopiers and scanners. For some patterns, the difference between copies and printed original is detectable by people; for other patterns, the difference is automatically detectable by a computer with a scanner.

In the currently preferred embodiment, watermarks are created with embedded data technology such as glyph technology developed by the Xerox corporation. Glyph technology as it is used as embedded data printed on a medium is described in U.S. Pat. No. 5,486,686 entitled "Hardcopy Lossless Data Storage and Communications For Electronic Document Processing Systems", which is incorporated by reference herein. Using glyphs as digital watermarks on printed documents is described in co/pending application Ser. No. 08/734,570 entitled "Quasi-Reprographics With Variable Embedded Data With Applications To Copyright Management, Distribution Control, etc.", which is assigned to the same assignee as the present application and is incorporated by reference herein.

Generally, embedded data technology is used to place machine readable data on a printed medium. The machine readable data typically is in a coded form that is difficult if not impossible for a human to read. Another example of an embedded data technology is bar codes.

Embedded data technology can be used to carry hundreds of bits of embedded data per square inch in various grey patterns on a page. Preferably, glyphs are used because the marks representing the encoded data can be used to create marks which are more aesthetically appealing then other embedded data technologies. With careful design, glyphs can be integrated as graphical elements in a page layout. Glyphs can be used with any kind of document. Glyph watermarks to carry document identification can be embedded by the publisher; while glyphs carrying data about a print event can be added to the watermark at the time of printing by a printing system. Both document identification and fingerprinting data can be embedded in the same watermark.

It should be noted that a disadvantage of glyphs and with all forms of visible and separable watermarks, is that with mechanical or computational effort, they can be removed from a document.

FIG. 7 illustrates an example of a document image having a glyph encoded watermark. Referring to FIG. 7, a document page 701 has various text 702. Also included is a glyph encoded watermark 703. Note that the document is not limited to text and may also include image or graphical data.

Integrating Embedded Data as Watermarks Into Trusted Printing Systems

This section describes briefly how embedded data technology can be used in trusted printing systems to embed watermarking data. How glyphs and watermark data are handled at each stage in creating, publishing, and printing a document is discussed.

It has been determined that for integrating embedded data such as glyphs into trusted printing systems, the requirements include:

Document designers such as authors and publishers must be able to specify on a page by page basis the position and shape of watermarks, so that they can be incorporated into the design of the document.

The approach should be compatible with mainline document creation (e.g. word processing) systems.

The approach should work within the protocols of existing printers.

The approach should carry the fingerprint (or run-time) data in Usage Rights specifications.

The approach should not significantly slow down printing.

Herein the term media-dependent data is used to refer to information about how a watermark is located and shaped within the document content. The approach depends on the use of Usage Rights to express the data to be encoded in the watermark.

Document Creation

Publishers use a wide variety of tools to create documents. Different text editors or word processors provide different ways and degrees of control in laying out text, pictures and figures. One thing that all text editors have is a way to locate text on a page. In effect, this is a lowest common denominator in abilities for all systems.

Exploiting this common capability provides insight about how to use glyphs to represent watermarks:

- Gyph watermarks are organized graphically as rectangular boxes.
- Different sized boxes have different capacities for carrying data. On 300 dpi printers, about 300 bytes per inch can be encoded in glyphs. Note that this can represent even more data if the original data is compressed prior to glyph encoding. Note for greater reliability, some data may be repeated redundantly, trading data capacity for reliability.
- Each glyph watermark is represented to a document creation program as a character in an initial glyph watermark font. Boxes of different sizes and shapes are represented as different characters for the initial glyph watermark font. When a digital work is printed, the encoding of the data is analogous to calculating and changing the watermark font.

In practice, a designer laying out a document would open a page of a glyph catalog containing glyph boxes of different sizes. The glyph boxes in the catalog would probably contain just test data, e.g. a glyph ASCII encoding of the words "test pattern glyph Copyright© Xerox Corporation 1997. All Rights Reserved". The designer would determine ahead of time how much data he wants to encode per page, such as 100, 300, 500, or 1000 bytes. The designer would copy a "box" (actually a character) of the corresponding size into their document and locate it where they want it on the page, typically incorporating it as a design element.

Figure 8:
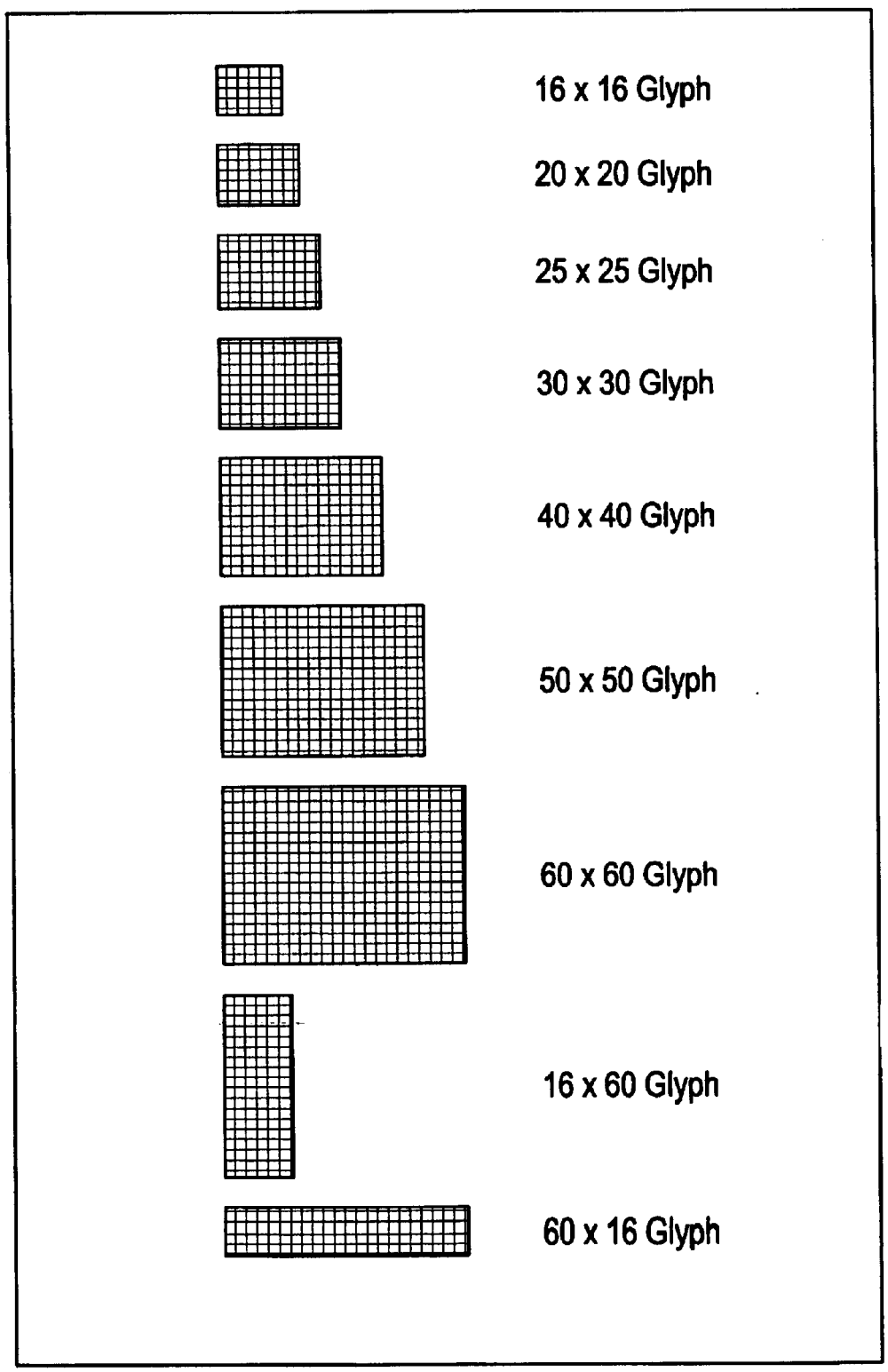
FIG. 8 is an illustration of a set of sample embedded data boxes having different storage capacities as may be used as watermark characters of a watermark font set in the currently preferred embodiment of the present invention.

FIG. 8 illustrates a set of sample watermark characters (i.e. glyph boxes) having different storage capacities. An actual catalog would contain additional shapes and would be annotated according to the data-carrying capacity of the glyphs.

Note that the glyph encoded watermarks can also be placed in figures, since drawing programs also have the capability to locate characters on a page.

When the creator saves their work, the document creation program writes a file in which characters in the glyph font are used to represent the watermarks. If the creator prints the document at this stage, he will see more or less what the final sold versions will look like except that the test data encoded in the gray tones of the glyph box will later be replaced by the dynamically generated watermark data.

Specifying Watermark Data

When the author or publisher gets ready to publish the work and import it into a system for controlling distribution use of digital works, one of the steps is to assign rights to the work using a Rights Editor. The Rights Editor is a program with which a document owner specifies terms and conditions of using a digital work.

Figures 9, 10:
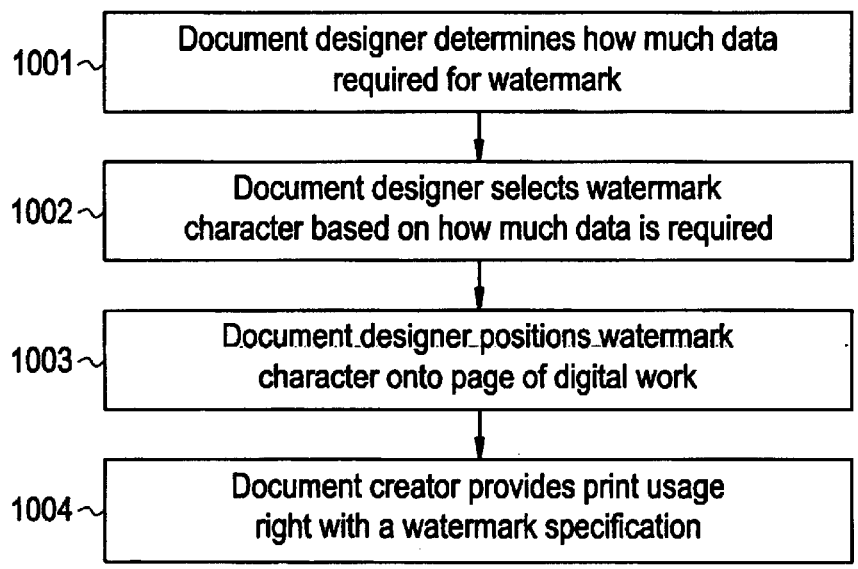
FIG. 9 is an illustration of a print right having the watermark information specified as may be used set in the currently preferred embodiment of the present invention.
FIG. 10 is a flowchart summarizing the basic steps for a creator to cause watermarks to be placed in their documents as may be performed in the currently preferred embodiment of the present invention.

This is the point at which document identification data and also print event data are specified. FIG. 9 illustrates the watermark information specified for a print right. Note that the watermark information specification is optional within the grammar. Referring to FIG. 9, print right 901 specifies that a purchaser of is the document must pay ten dollars to print the document (at fee specification 902). The document must only be printed on a trusted printer of a given type (at printer specification 903). Furthermore, the watermark must embed a particular string "Title: Moby Dog Copyright 1994 by Zeke Jones. All Rights Reserved" and also include various data about the printing event (at Watermark-Tokens specification 904). Note that the watermark tokens specification are used to specify the "fingerprint" information associated with the printing of the digital work. Here the specified printing event data is who printed it out, the name of the institution printing it out, the name of the printer, the location of the printer and the time that the digital work was printed. As will be described below, this information is obtained at print time.

FIG. 10 is a flowchart summarizing the basic steps for a creator to cause watermarks to be placed in their documents. As part of the layout of the textual document the designer determines how much data is required by the watermark, step 1001. Based on the amount of needed data, a suitable watermark character (e.g. glyph box) is selected, step 1002. The watermark character is then positioned onto a page (or the pages) of the digital work, step 1003. Finally, as part of the rights assignment for the digital work document, a print right with a watermark specification is made, step 1004. At this point, the document can be viewed with the watermark positioned in the desired place(s) on the document. However, the actual fingerprint and other identifying data in an embedded data format has not yet been created. This is created dynamically at print time as described below.

Printing the Digital Work

The next steps for the digital work are that it is published and distributed. During this process, the digital work is protected by the encryption and other security systems that are employed and the rights travel with the document. Part of this process assures that any printer or workstation that has a copy of the document also has digital certificates which contain information identifying the trusted system, trusted printer, user, and so on (a process described in more detail in co-pending application Ser. No. 08/344,042).

Figure 11:
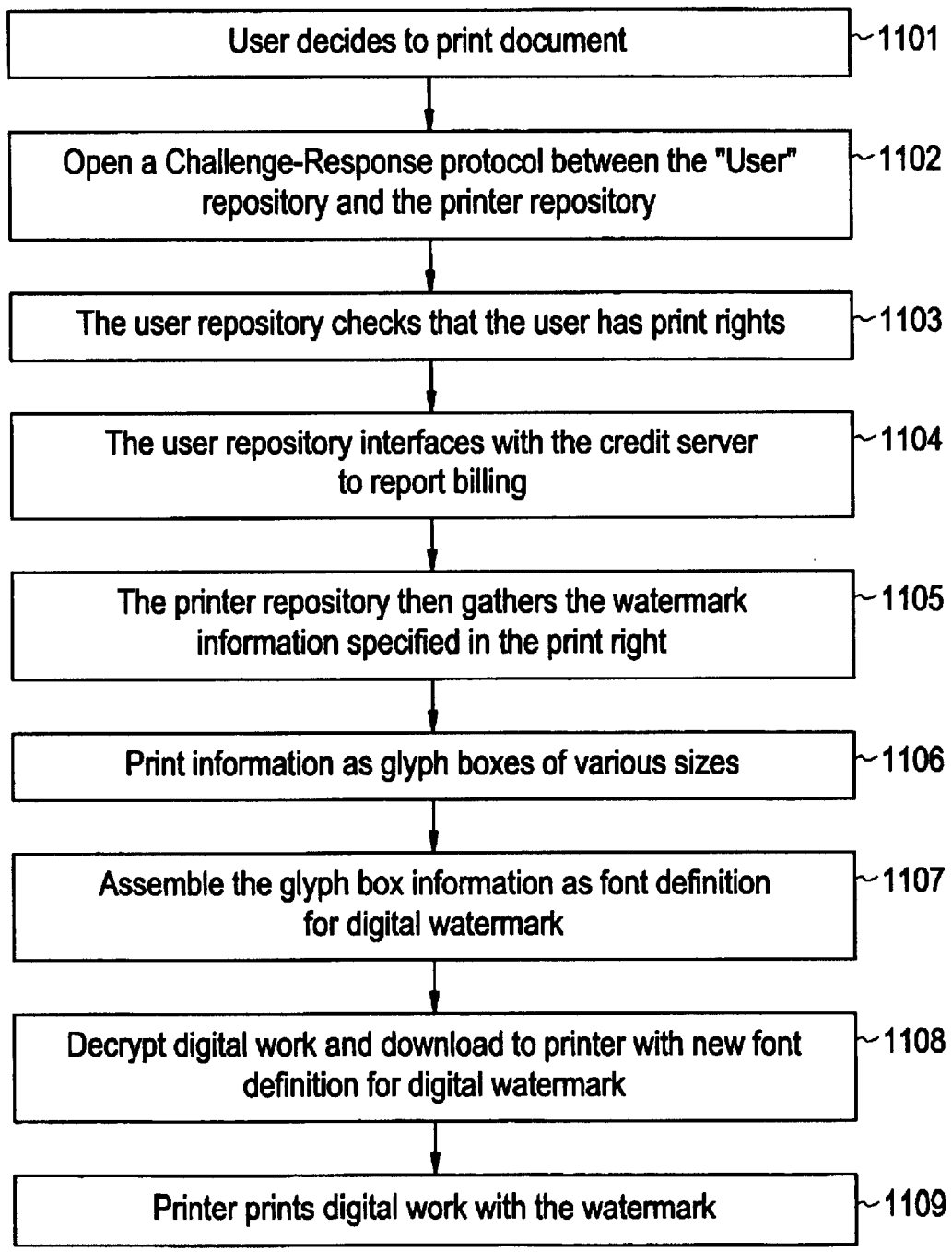
FIG. 11 is a flowchart of the steps required for printing a document as may be performed in the currently preferred embodiment of the present invention.

FIG. 11 is a flowchart of the steps required for printing a document. Referring to FIG. 11, at some point, a user decides to print a document, step 1101. Typically this is done via a print command invoked through some interface on the users system. This opens a challenge-response protocol between the "user" repository containing the document and the printer repository, step 1102. During this exchange, the security and watermark capabilities of the printer are checked. If the printer does not have the proper security or watermark capabilities, the digital work cannot be printed on that printer. The printer security level and watermark capabilities are specified in the identification certificate for the printer. Assuming that the printer has the proper security levels and watermark capabilities, the "user" repository then checks that the digital work has the required print right, step 1103. Assuming that the digital work has required print right the user repository may interface with a credit server to report any required fees for the printing the digital work, step 1104. Note that the actual billing for the digital work may occur when the right is invoked either when the print exercised or when it can be verified that the document has been printed. The latter case protects the user in the situation wherein printing may become inadvertently terminated before the entire digital work is printed.

A computation is then performed to gather together the information to be embedded in the watermark and to incorporate it into a new font for the watermark character. First the information must be gathered from digital identification certificates belonging to the user or the trusted printer, such as names, locations, and the current date and time, step 1105. This information is "printed" internally into computer memory, creating a bitmap image of glyph boxes of different sizes, step 1106. Creation and coding of glyphs is described in the aforementioned U.S. Pat. No. 5,486,686, thus no further discussion on the encoding of glyph patterns is deemed necessary. In any event, this information is then assembled into a font definition, step 1107.

The digital work is then decrypted and downloaded into the printer, step 1108. When the digital work is downloaded into the printer, part of the protocol is also to download the new "revised" glyph font, which now has characters corresponding to glyph boxes. This font looks more or less like the one that the publisher used in creating the document, except that the gray codes inside the font boxes now embed the data that the publisher wants to appear in the watermarks on the document.

The printer then prints the digital work, step 1109. When the document is printed, the glyphs that appear on the pages contain the desired watermark data.

Reading the Embedded Data Contained in the Watermark

Figure 12:
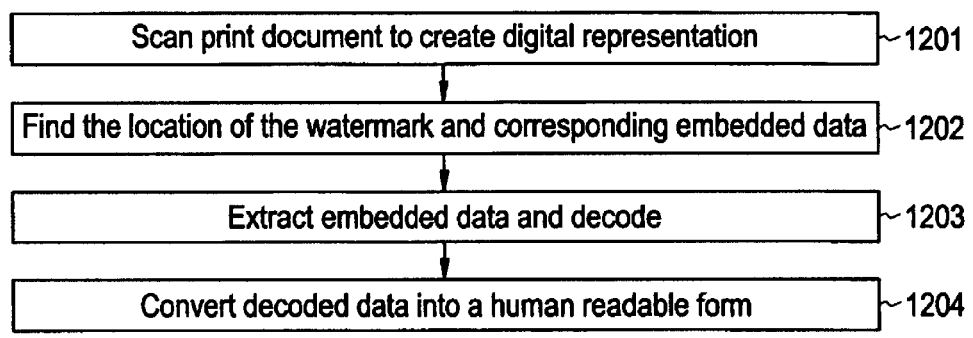
FIG. 12 is a flowchart outlining the basic steps for extracting the embedded data as may be performed in the currently preferred embodiment of the present invention.

FIG. 12 is a flowchart outlining the basic steps for extracting the embedded data. First, the printed document is scanned and a digital representation obtained, step 1201. The location of the watermark and the corresponding embedded data is then found, step 1202. The watermark may be found using techniques for finding characteristic pixel patterns in the digital representation of the printed document. Alternatively, a template for the document may have been created that could be used to quickly find the watermark location. In any event, the embedded data is extracted from the watermark and decoded, step 1203. The decoded data is then converted to a human readable form, step 1204. This may be on a display or printed out. The data extracted is then used to identify who and where the unauthorized reproduction of the digital work came from.

Note that the means for extraction of the watermark data is dependent on the technology used to embed the watermark data. So while the actual extraction steps may vary, they do not cause departure from the spirit and scope of the present invention.

Trusted Printer Embodiments

In the following, two embodiments of trusted printer implementations are described: desktop implementations for personal printers and print server implementations for larger workgroup and departmental printers.

Desktop Implementations

There is a large and growing install base of personal printers. Typically, such printers are connected to personal computers by serial output ports. In other cases, they are installed on small local area networks serving a few offices.

To serve this market a "trust box" is provided which would be positioned in between the personal computer and the personal printer. The "trust box" would act as a print repository for the trusted printer system. This is a market where the purchase of such hardware would be justified by the convenience of digital delivery to the office, for those documents that publishers are unwilling to send in the clear (i.e. not encrypted). The cost of the trust box offsets either waiting for mail delivery or driving to another location to pick up trusted printer output.

Figure 13:
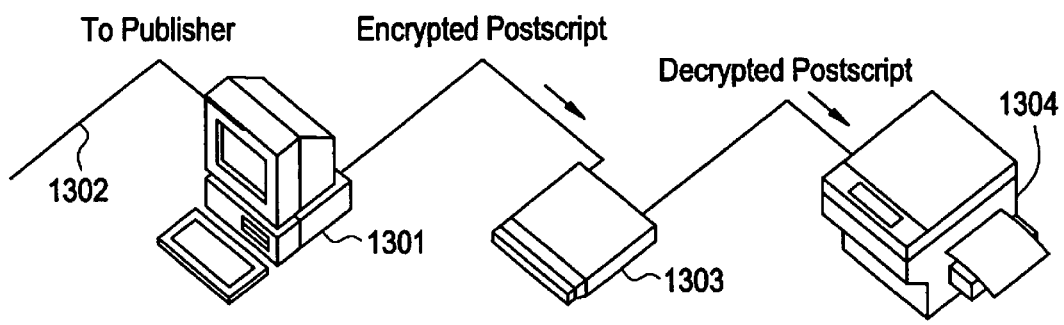
FIG. 13 is an illustration of an implementation of the present invention as a trust box coupled to a computer based system.

FIG. 13 is an illustration of a trust box in a computer based system. Referring to FIG. 13, a personal computer 1301 is coupled to a network 1302. The personal computer 1301 itself is part of a trusted system in that it embodies a repository. The personal computer would receive digital works through the network 1302 (e.g. over the Internet). The personal computer 1301 is further coupled to trust box 1303. The communications between the repository contained in the personal computer 1301 and the trust box 1303 are encrypted for security purposes. Finally, the trust box 1303 is coupled to a printer 1304. The printer 1304 receives decrypted print streams for printing.

From a conceptual perspective, the personal computer combined with the trust box and printer form a trusted system. The trust box implementation would work with other system elements as illustrated in the steps of the flowchart of FIG. 14.

Figure 14:
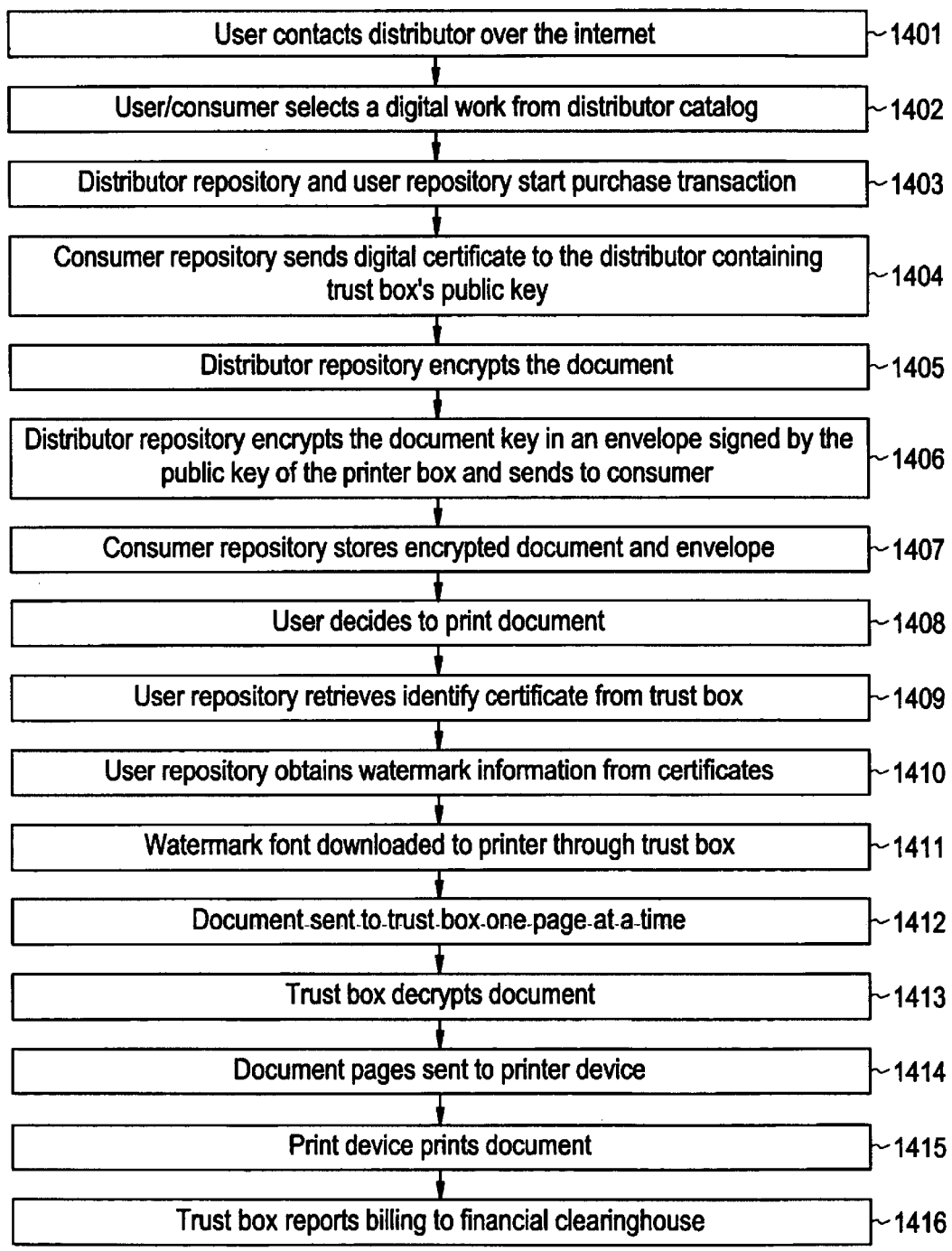
FIG. 14 is a flowchart illustrating the steps involved in printing a digital work using the trust box implementation of FIG. 13.

Referring to FIG. 14, the consumer contacts the distributor of digital works using, for example, an Internet browser such as Netscape Navigator or Microsoft Explorer, step 1401. For the sake of brevity, it is assumed that a trusted session is established between the consumer's repository and the distributor's repository. Using known user interface methods, the consumer selects a work from a catalog or search service, step 1402. In this example, it is assumed that the rights holder has associated a Print right with the document, and that all terms and conditions for exercising the right are met by the consumer and the trust box.

Once a work is selected the two repositories begin a purchase transaction, step 1403. As described in application Ser. No. 08/344,042, there are several variations for billing. For concreteness, it is assumed that there is a billing account associated with the trust box.

Using a helper application (or equivalent), the consumer's repository sends a digital certificate to the distributor which contains the trust box's public key, step 1404. The certificate itself is signed by a well-known repository, such as the printer's manufacturer.

The distributor repository encrypts the document using DES or some other encryption code, step 1405. The encryption uses a key length that is compatible with requirements of security and legal constraints. The distributor repository encrypts the document key in an envelope signed by the public key of the printer box, step 1406. The distributor repository then sends the encrypted document and the envelope along to the consumer's workstation.

The personal computer stores the encrypted document in its repository along with the envelope containing the key, step 1407.

At some point, the user decides to print the document. Using a print program, he issues a print request, step 1408. His personal computer contacts the trust box, retrieving its identity certificate encrypted in its public key, step 1409. It looks up the watermark information in certificates from the user, the computer itself, and the printer, step 1410. It downloads the watermark font to the printer through the trust box, step 1411.

The print program begins sending the document, one page at a time to the trust box, step 1412.

The trust box contacts the printer. It decrypts the document giving the document key to a decryption means (e.g. an internal decryption chip), step 1413. It transmits the document to the printer in the clear, step 1414. Note that this is one place where a digital copy could be leaked, if a printer emulator was plugged into the print box to act like a printer. Presumably the security level of the trust box is set to a value that reflects the level of risk. The document is then printed, step 1415.

The trusted print box design is intended to meet several main design objectives as follows:

Installed Base. This approach is intended to work within the current installed base of desktop or personal printers. Installing a trusted print box requires loading software and plugging standard serial cables between the printer, the trusted print box, and the computer.

Security. The approach inhibits unauthorized photocopying through the use of glyph watermarks. The approach inhibits digital copying by storing digital works in an encrypted form, where the consumer workstation does not have access to the key for decrypting the work.

Printer Limitations. The approach assumes that the user will plug the trusted print box into a standard printer. The printer is assumed to not have the capability of storing extra copies of the digital work.

Building box in Printer. Variations of this approach include incorporating the trusted print box into the printer itself. That variation has the advantage that it does not present the document in the clear along any external connectors.

Weak Link. A weak link in this approach is that there is an external connector that transmits the document in the clear. Although this is beyond the average consumer, it would be possible to build a device that sits between the trusted printer box and the printer that would intercept the work in the clear.

Billing Variations. In the version presented here, the trusted print box has secure storage and programs for managing billing records. A simpler version of the approach would be to keep track of all billing on-line. For example, one way to do this would be to have the document printing start at the time that the customer orders it. In this variation, the document is still sent in encrypted form from the publisher, through the consumer's workstation, decrypted, and sent to the trusted print box, to the printer. The difference is that the trusted print box no longer needs to keep billing records and that the consumer must start printing the document at the time that the document is ordered.

Software-only Variation. Another variation on the desktop printing solution involves only software. The consumer/client purchases the work and orders the right to print it once. The on-line distributor delivers the work, encrypted, one page at a time. The consumer workstation has a program that decrypts the page and sends it to the printer with watermarks, and then requests the next page. At no time is a full decrypted copy available on the consumer's computer. The weak link in this approach is that the consumer's computer does gain access to copies of pages of the work in the clear. Although this would be beyond the average consumer, it would be possible to construct software either to mimic runtime decryption software or modify it to save a copy of the work, one page at a time.

Printer Server Implementations

Much of the appeal of trusted printers is to enable the safe and commercial printing of long documents. Such printing applications tend to require the speed and special features of large, shared printers rather than personal printers. Provided herein is an architecture for server-based trusted printers.

Besides the speed and feature differences of the print engines themselves, there are some key differences between server-based trusted printers and desktop trusted printers.

Server-based printers store complete copies of documents in files.

Server-based printers have operating systems and file systems that may be accessible via a network.

Server-based printers have consoles, accessible to dedicated or walk-up operators depending on the installation.

These basic properties of server-based printers create their own risks for document security which need to be addressed. In addition, since server-based printers tend to be high volume and expensive, it is important that the trusted system features not significantly slow down competitive printer performance.

From a conceptual perspective, the print server (including network services and spooling) combined with the printer forms a trusted system.

In abstract and functional terms, the operation of the server implementation is similar to that of the trust box implementation. The difference is that the server performs many of the operations of the trust box.

There are many variations on how the print server may need to interoperate with the other system elements. For example, the transaction with the printer may be with the user's computer or with an on-line repository that the user is communicating with. In the following, the transaction is described as happening from a repository, although that repository may be the user's own computer.

Figure 15:
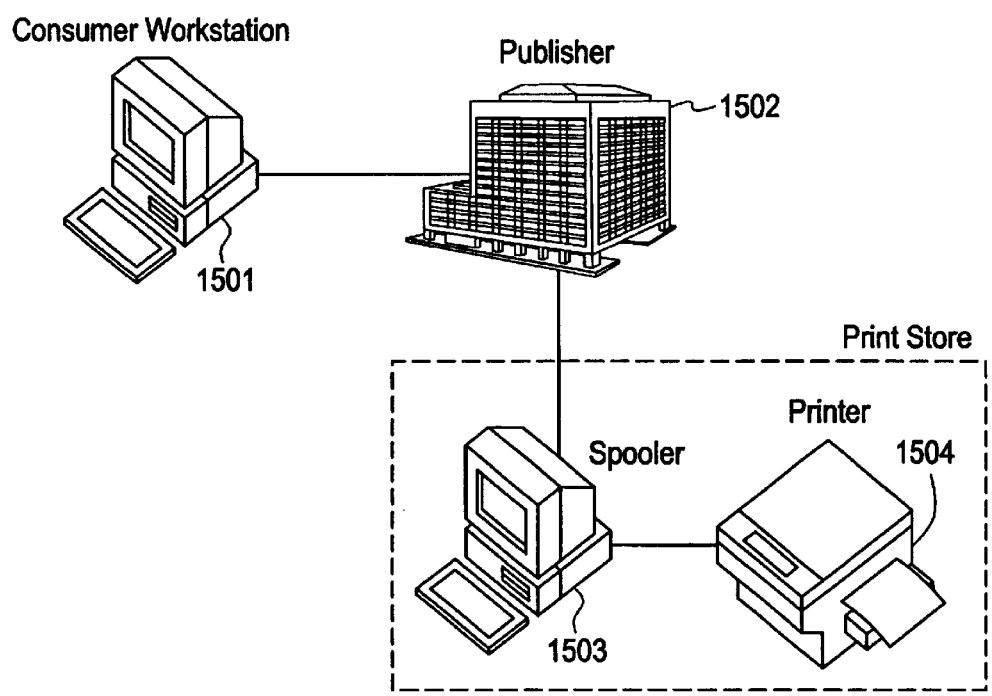
FIG. 15 is an illustration of an implementation of the present invention as a printer server.

FIG. 15 is a block diagram illustrating a print server implementation. Referring to FIG. 15, a consumer workstation 1501 is coupled to publisher repository 1502. The publisher repository 1502 couples directly with a spooler in printer repository 1503. The spooler is responsible for scheduling and printing of digital works. The spooler 1503 is coupled to the printer 1504.

Figure 16:
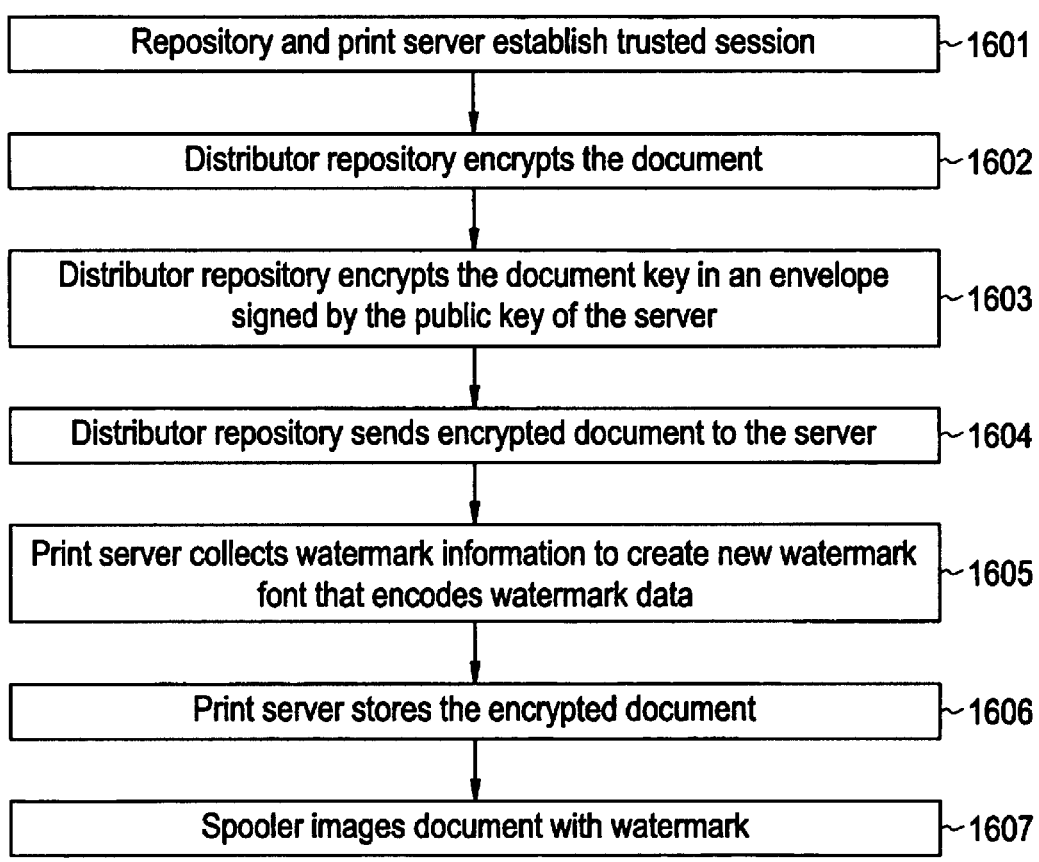
FIG. 16 is a flowchart illustrating the steps involved in printing a digital work using the printer server implementation of FIG. 15.

The server implementation would work with other system elements as illustrated in the steps of the flowchart of FIG. 16. Referring to FIG. 16, the repository contacts the trusted printer's server, engaging in a challenge-response protocol to verify that the printer is of the right type and security level to print the work, step 1601. These interactions also give the printer public certificates for the repository and user, that are used for retrieving watermark information.

The distributor encrypts the document using DES or some other code, using a key length that is compatible with requirements of security and legal constraints, step 1602. It encrypts the document key in an envelope signed by the public key of server, step 1603. It sends the encrypted document to the server, step 1604.

Note that in some versions of this architecture, different levels of encryption and "scrambling" (less secure) are used on the document at different stages in the server. It is generally important to protect the document in all places where it might be accessed by outside parties. The use of lower security encoding is sometimes used to avoid potentially-expensive decryption steps at critical stages that would slow the operation of the printer.

In any event, the server stores the encrypted document, step 1605. At some point, the spooler gets ready to print the document. Before starting, it runs a process to create a new version of the glyph font that encodes the watermark data, step 1606. It looks up the required watermark information in its own certificates as well as certificates from the repository and user.

Finally, the spooler begins imaging the document, one page at a time, step 1607.

Thus, trusted rendering systems for use in a system for controlling the distribution and use of digital works are disclosed. While the present invention is described with respect to a preferred embodiment, it would be apparent to one skilled in the art to practice the present invention with other configurations of information retrieval systems. Such alternate embodiments would not cause departure from the spirit and scope of the present invention.

APPENDIX A

Grammar for the Usage Rights Language work-specification→
  (Work:
  (Rights-Language-Version: version-id)
  (Work-ID: work-id )$_{opt}$
  (Description: text-description)$_{opt}$
  (Owner: certificate-spec)$_{opt}$
  (Parts: parts-list)$_{opt}$
  (Contents: (From: address) (To: address))$_{opt}$
  (Copies: copy-count)$_{opt}$
  (Comment: comment-str)$_{opt}$
  rights-group-list
parts-list→work-id | work-id parts-list
copy-count→integer-constant | unlimited
rights-group-list→
  rights-group-spec rights-group-list$_{opt}$
rights-group-spec→
  (rights-group-header rights-group-name

```
    bundle-spec_opt
    comment_opt
    rights-list)
rights-group-header→
    Rights-Group: |
    Reference-Rights-Group:
bundle-spec→
    (Bundle: comment_opt time-spec_opt access-spec_opt fee-
        spec_opt watermark-spec_opt)
comment→(Comment: comment-str)
rights-list→right rights-list_opt
right→(right-code comment_opt time-spec_opt access-
        spec_opt fee-spec_opt)
right-code→
    transport-code |
    render-code |
    derivative-work-code |
    file-management-code |
    configuration-code
transport-code→transport-op-spec next-copy-rights-spec_opt:
transport-op-spec→
    Copy: |
    Transfer: |
    Loan: remaining-rights-spec_opt
next-copy-rights-spec→(Next-Copy-Rights: next-set-of-
    rights)
remaining-rights-spec→(Remaining-Rights: rights-groups-
    list)
next-set-of-rights→rights-to-add-spec_opt | rights-to-delete-
    spec_opt
rights-to-add-spec→(Add: rights-groups-list)
rights-to-delete-spec→(Delete: rights-groups-list)
render-code→
    Play: player-spec_opt |
    Print: printer-spec_opt |
    Export: repository-spec_opt
player-spec→(Player: certificate-list)_opt (Watermark:
    watermark-spec)_opt
printer-spec→(Printer: certificate-list)_opt (Watermark:
    watermark-spec)_opt
repository-spec→(Repository: certificate-list)_opt
derivative-work-code→
    derivative-op-spec editor-spec_opt next-copy-rights-spec_opt
derivative-op-spec→
    Edit: |
    Extract: |
    Embed:
editor-spec→(Editor: certificate-list)
file-management-code→
    Backup: backup-copy-rights-spec_opt |
    Restore: |
    Verify: verifier-spec_opt |
    Folder: |
    Directory: |
    Delete:
backup-copy-rights-spec→Backup-Copy-Rights: rights-
    groups-list
verifier-spec→(Verifier: certificate-list)
configuration-code→
    Install: |
    Uninstall:
time-spec→
        (Time: interval-type expiration-spec_opt)
interval-type→
    fixed-interval-spec |
    sliding-interval-spec |
    metered-interval-spec
fixed-interval-spec→(From: moment-spec)
sliding-interval-spec→(Interval: interval-spec)
metered-interval-spec→(Metered: interval-spec)
expiration-spec→(Until: moment-spec)
moment-spec→date-constant time-of-day-constant_opt
interval-spec→
    calendar-units-constant |
    time-units-constant |
    calendar-units-constant time-units-constant
fee-spec→(Fee: ticket-spec | monetary-spec)
ticket-spec→(Ticket: (Authority: authority-id) (Type: ticket-
    id))
monetary-spec→
    (fee-type min-price-spec_opt max-price-spec_opt account-
        spec)
fee-type→
    (Per-Use: money-units)|
    (Metered: (Rate: money-units)
        (Per: interval-spec) (By: interval-spec)_opt |
    (Best-Price-Under: money-units)|
    (Call-For-Price: dealer-id)|
    (Markup: percentage)
money-units→floating-constant (Currency: ISO-Currency-
    Code)_opt
account-spec→(To: account-id) (House: clearing-house-id)
    _opt |
    (From: account-id) (House: clearing-house-id)_opt
min-price-spec→(Min: (Rate: money-units) (Per: interval-
    spec))
max-price-spec→(Max: (Rate: money-units) (Per: interval-
    spec))
access-spec→
    (Access: security-class-spec_opt
    user-spec_opt
    source-spec_opt
    destination-spec_opt)
-class-spec→(Security: s-list)
s-list→s-pair | s-pair s-list
s-pair→(s-name: s-value)
s-name→literal-constant
s-value→floating-constant
user-spec→(User: authorization-spec)
source-spec→(Source: authorization-spec)
destination-spec→
    (Destination: authorization-spec)
authorization-spec→
    (Any: certificate-list) |
    certificate-list
certificate-list→certificate-spec certificate-list_opt
certificate-spec→(Certificate: (Authority: authority-id)
    property-list_opt)
property-list→property-pair | property-pair property-list
property-pair→(property-name: property-value)
property-name→literal-constant
property-value→string-constant | literal-constant
    | floating-constant | integer-constant
watermark-spec→watermark-info-list
watermark-info-list→watermark-str-spec_opt watermark-
    info-list_opt |
``` watermark-token-spec$_{opt}$ watermark-info-list$_{opt}$ |
   watermark-object-spec$_{opt}$ watermark-info-list$_{opt}$
watermark-str-spec→(Watermark-Str: watermark-str)
watermark-token-spec→(Watermark-Tokens: watermark-tokens)
watermark-tokens→watermark-token watermark-tokens$_{opt}$
watermark-token→all-rights | render-rights |
   user-name | user-id | user-location |
   institution-name | institution-id | institution-location |
   render-name | render-id | render-location | render-time
watermark-object-spec→(Watermark-Object: work-id)

What is claimed is:

1. A system that controls the distribution and use of digital documents comprising:
　a usage right determination device that determines a usage right that identifies how a digital document may be used or distributed; and
　a usage right association device that associates the usage right, the digital document and a rendering right, wherein the rendering right governs rendering of the digital document and includes information that embeds watermark information into a rendered digital document, the watermark information including information relating to the rendering of the digital document.

2. The system of claim 1, wherein the rendering right includes security information and watermarking criteria of a rendering device.

3. The system of claim 1, wherein the rendering right is a print right.

4. The system of claim 1, further comprising a digital document authoring device that allows creation of the digital document and encoding of the watermark information.

5. The system of claim 4, wherein the watermark information includes a dynamic watermark font.

6. The system of claim 4, wherein the watermark information is based on a quantity of data to be placed in a watermark.

7. The system of claim 1, further comprising a rendering repository that receives the digital document and generates a watermark based on the watermark information.

8. The system of claim 1, wherein the watermark is a dynamic watermark.

9. The system of claim 1, further comprising a usage right verification device that determines the validity of the usage right.

10. The system of claim 1, further comprising a billing device that tracks expenses associated with the usage right.

11. The system of claim 1, wherein the usage right, the digital document and the rendering right are communicated within a trusted environment.

12. A method of controlling the distribution and use of digital documents comprising:
　determining a usage right that identifies how a digital document may be used or distributed; and
　associating the usage right, the digital document and a rendering right, wherein the rendering right governs rendering of the digital document and includes information that embeds watermark information into a rendered digital document, the watermark information including information relating to the rendering of the digital document.

13. The method of claim 12, wherein the rendering right includes security information and watermarking criteria of a rendering device.

14. The method of claim 12, wherein the rendering right is a print right.

15. The method or claim 12, further comprising creating of the digital document and encoding of the watermark information.

16. The method of claim 15, wherein the watermark information includes a dynamic watermark font.

17. The method of claim 15, wherein the watermark information is based on a quantity of data to be placed in a watermark.

18. The method of claim 12, further comprising receiving the digital document and generating a watermark based on the watermark information.

19. The method of claim 12, wherein the watermark is a dynamic watermark.

20. The method of claim 12, further comprising determining the validity of the usage right.

21. The method of claim 12, further comprising tracking expenses associated with the usage right.

22. The method of claim 12, wherein the usage right, the digital document and the rendering right are communicated within a trusted environment.

23. An information storage media comprising information that controls the distribution, and use of digital documents comprising:
　information that determines a usage right that identifies how a digital document may be used or distributed; and
　information that associates the usage right, the digital document and a rendering right, wherein the rendering right governs rendering of the digital document and includes information that embeds watermark information into a rendered digital document, the watermark information including information relating to the rendering of the digital document.

24. The information storage media of claim 23, wherein the rendering right includes security information and watermarking criteria of a rendering device.

25. The information storage media of claim 23, wherein the rendering right is a print right.

26. The information storage media of claim 23, further comprising information that creates the digital document and encodes the watermark information.

27. The information storage media of claim 26, wherein the watermark information includes a dynamic watermark font.

28. The information storage media of claim 26, wherein the watermark information based on a quantity of data to be placed in a watermark.

29. The information storage media of claim 23, further comprising information that receives the digital document and generates a watermark based on the watermark information.

30. The information storage media of claim 23, wherein the watermark is a dynamic watermark.

31. The information storage media of claim 23, further comprising information that determines the validity of the usage right.

32. The information storage media of claim 23, further comprising information that tracks expenses associated with the usage right.

33. The information storage media of claim 23, wherein the usage right, the digital document and the rendering right are communicated within a trusted environment.

* * * * *